(12) United States Patent
Pulikonda et al.

(10) Patent No.: US 12,331,579 B2
(45) Date of Patent: *Jun. 17, 2025

(54) CONTROL OF A POWER TAILGATE SYSTEM RESPONSIVE TO CLUTCH SLIPPAGE

(71) Applicant: Aisin Technical Center of America, Inc., Northville, MI (US)

(72) Inventors: Gowtham Harsha Pulikonda, New Hudson, MI (US); Yasuyuki Noiri, Walled Lake, MI (US); Nicholas Ozog, South Lyon, MI (US); Ryan Heins, Wixom, MI (US)

(73) Assignee: AISIN World Corp. of America, Northville, MI (US)

( * ) Notice: Subject to any disclaimer, the term of this patent is extended or adjusted under 35 U.S.C. 154(b) by 341 days.

This patent is subject to a terminal disclaimer.

(21) Appl. No.: 17/682,625

(22) Filed: Feb. 28, 2022

(65) Prior Publication Data
US 2023/0272664 A1    Aug. 31, 2023

(51) Int. Cl.
| | | |
|---|---|---|
| *E05F 15/75* | (2015.01) | |
| *E05F 15/622* | (2015.01) | |
| *F16D 7/00* | (2006.01) | |
| *F16D 21/00* | (2006.01) | |

(Continued)

(52) U.S. Cl.
CPC ............ *E05F 15/75* (2015.01); *E05F 15/622* (2015.01); *F16D 7/00* (2013.01); *F16D 21/00* (2013.01); *G07C 5/0816* (2013.01); *E05Y 2201/216* (2013.01); *E05Y 2201/232* (2013.01); *E05Y 2201/434* (2013.01); *E05Y 2201/70* (2013.01); *E05Y 2201/702* (2013.01); *E05Y 2400/20* (2013.01); *E05Y 2400/354* (2013.01); *E05Y 2400/522* (2013.01); *E05Y 2800/40* (2013.01);

(Continued)

(58) Field of Classification Search
CPC ..... F16D 28/00; F16D 7/00; E05Y 2900/544; E05Y 2800/40; E05Y 2800/522; E05Y 2800/354; E05Y 2800/20; E05Y 2201/232; E05Y 2201/216; G07C 5/0816
See application file for complete search history.

(56) References Cited

U.S. PATENT DOCUMENTS

| | | | |
|---|---|---|---|
| 9,587,421 B1* | 3/2017 | Harrison | ..................... B60J 5/10 |
| 9,795,445 B2 | 10/2017 | Bowling | |
| 11,535,309 B2 | 12/2022 | Heins et al. | |

(Continued)

FOREIGN PATENT DOCUMENTS

JP    2001246936 A    9/2001

*Primary Examiner* — Anne Marie Antonucci
*Assistant Examiner* — Luis G Del Valle
(74) *Attorney, Agent, or Firm* — Christopher G. Darrow; Darrow Mustafa PC

(57) ABSTRACT

A method for controlling a power tailgate in a vehicle power tailgate system includes steps of controlling operation of a motor to attempt to lower or raise a tailgate operably connected to the motor, determining that a clutch interposed between the motor and the tailgate (and operably connected to the motor and the tailgate) slipped by at least a predetermined slip amount during operation of the motor to attempt to lower or raise the tailgate and, responsive to the determination that the clutch slipped by at least the predetermined slip amount, generating an alert indicating a need for manual reset of the tailgate.

18 Claims, 10 Drawing Sheets

(51) Int. Cl.
   *F16D 28/00* (2006.01)
   *G07C 5/08* (2006.01)
(52) U.S. Cl.
   CPC ......... *E05Y 2900/544* (2013.01); *F16D 28/00* (2013.01)

(56) References Cited

U.S. PATENT DOCUMENTS

| | | | |
|---|---|---|---|
| 11,821,241 | B2 | 11/2023 | Noiri et al. |
| 12,123,231 | B2 | 10/2024 | Heins et al. |
| 2004/0046418 | A1* | 3/2004 | Chikata .................. E05F 15/63 296/146.4 |
| 2010/0186528 | A1* | 7/2010 | Hillen ..................... F16D 7/048 192/56.6 |
| 2015/0211279 | A1* | 7/2015 | Suzuki .................... H02K 7/10 16/65 |
| 2015/0361710 | A1* | 12/2015 | Hansen ................ E05F 15/614 296/50 |
| 2017/0292310 | A1* | 10/2017 | Podkopayev ......... E05C 17/006 |
| 2018/0356789 | A1* | 12/2018 | Wedemeyer ......... G05B 19/404 |
| 2019/0301231 | A1 | 10/2019 | Gabianelli et al. |
| 2020/0340282 | A1* | 10/2020 | Sproule ..................... F16H 1/28 |
| 2021/0131160 | A1* | 5/2021 | Kobayashi .............. E05F 11/12 |
| 2022/0381068 | A1 | 12/2022 | Heins et al. |
| 2023/0100832 | A1* | 3/2023 | Sargent ............. B62D 33/0273 49/31 |
| 2023/0203869 | A1* | 6/2023 | Sproule .................. E05F 5/025 16/49 |

* cited by examiner

CONTROL OF A POWER TAILGATE SYSTEM RESPONSIVE TO CLUTCH SLIPPAGE

TECHNICAL FIELD

The embodiments disclosed herein relate to vehicles with tailgates and, more particularly, to tailgate control systems for automatically opening the tailgates and automatically closing the tailgates.

BACKGROUND

Many vehicles include tailgates. The tailgate is rotatably connected to the vehicle and is movable between closed positions and open positions to serve as a closure panel for a rear portion of the vehicle. Many of today's vehicles have power tailgates included as part of power tailgate systems. The power tailgate system includes motor-driven tailgate actuators for the tailgates, and motor-driven latch actuators for the latch assemblies. By the operation of the tailgate actuators and the latch actuators, the power tailgate system automatically opens the tailgate and automatically closes the tailgate. Tailgate opening commands to the power tailgate system may be initiated by a user using a switch inside the vehicle or a keyfob.

Operation of the motor (expressed, for example, as a number of rotations of a motor armature) may be associated with motions of the tailgate, so that it is known how many armature rotations correspond to each predefined motion of the tailgate (for example, movement of the tailgate between fully closed and fully open positions). During operation of the power tailgate system, application of external forces (i.e. forces other than those exerted by the actuator motor) to the tailgate may cause backdriving of the motor. If this backdriving is severe enough, it may damage the motor. A slippable clutch may be interposed at some point between the motor and the tailgate to enable motion of the tailgate independent of the motor when the applied external forces are large enough to otherwise damage the tailgate. However, if the applied forces are large enough to cause the clutch to slip, the synchronization and association between the motor rotation and the tailgate motion may be disrupted to the point where a desired positon of the tailgate is no longer provided by operating the motor for the associated number of armature rotations.

SUMMARY

In one aspect of the embodiments described herein, a method for controlling a power tailgate in a vehicle power tailgate system includes steps of controlling operation of a motor to attempt to lower or raise a tailgate operably connected to the motor, determining that a clutch interposed between the motor and the tailgate (and operably connected to the motor and the tailgate) slipped by at least a predetermined slip amount during operation of the motor to attempt to lower or raise the tailgate and, responsive to the determination that the clutch slipped by at least the predetermined slip amount, generating an alert indicating a need for manual reset of the tailgate.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

A system for controlling a power tailgate in a vehicle power tailgate system includes a motor, a reduction drive operably connected to the motor, and a slippable clutch operably connected to the reduction drive. A screw is operably connected to the clutch. The clutch is structured to transmit torque between the reduction drive and the screw. A slide is operably connectible to a tailgate and operably connected to the screw so that rotation of the screw produces an associated linear extension or retraction of the slide. The system also includes a processor and a memory communicably coupled to the processor. The memory stores a tailgate control module including instructions that when executed by the processor cause the processor to, responsive to an input from a user, control operation of the motor to attempt to lower or raise the tailgate, determine whether the clutch slipped by at least a predetermined slip amount during operation of the motor to attempt to lower or raise the tailgate and, responsive to a determination that the clutch slipped by at least the predetermined slip amount, generate an alert indicating a need for manual reset of the tailgate. An excessive slippage of the clutch during tailgate movement may be detected based on parameters such as a known number of motor armature rotations expected for a desired movement of the tailgate from a first predefined position to a second predefined position, a number of armature rotations actually detected during the desired movement, and a current position of the tailgate. Also disclosed is a method for controlling a power tailgate in a vehicle power tailgate system, the method including steps of controlling operation of a motor to attempt to lower or raise a tailgate operably connected to the motor, determining that a clutch interposed between the motor and the tailgate (and operably connected to the motor and the tailgate) slipped by at least a predetermined slip amount during operation of the motor to attempt to lower or raise the tailgate, and responsive to the determination that the clutch slipped by at least the predetermined slip amount, generating an alert indicating a need for manual reset of the tailgate.

Figure 1A:
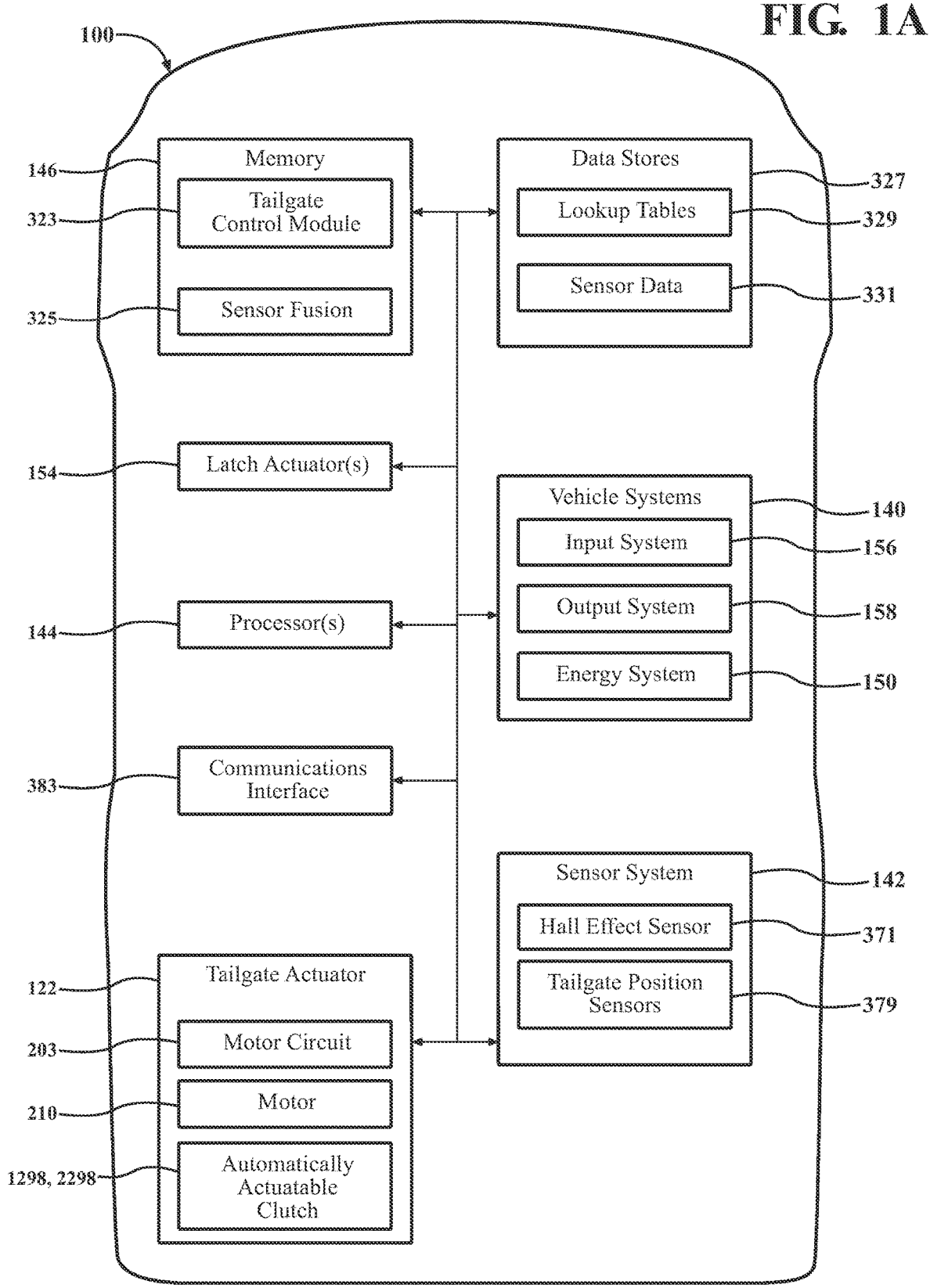
FIG. 1A is a schematic block diagram showing elements of a vehicle incorporating a power tailgate system, including a powered tailgate, an actuator, and a tailgate control module used for controlling operation of the tailgate.

Referring to FIG. 1A, an example of a vehicle 100 is illustrated. In one or more implementations, the vehicle 100 is pickup truck with a rear tailgate that may be automatically lowered (i.e., "opened") and raised (i.e., "closed"). The terms "open", "opened", "opening", etc. and "lower", "lowered", "lowering", etc. may be used interchangeably herein as applied to the tailgate. Similarly, the terms "close", "closed", "closing", etc. and "raise", "raised", "raising", etc. may be used interchangeably herein as applied to the tailgate. The vehicle 100 can have any combination of the various elements shown in FIG. 1A. Further, the vehicle 100 can have additional elements to those shown in FIG. 1A. In some arrangements, the vehicle 100 may be implemented without one or more of the elements shown in FIG. 1A. While the various elements are shown as being located within the vehicle 100 in FIG. 1A, it will be understood that one or more of these elements can be located external to the vehicle 100.

Additionally, it will be appreciated that for simplicity and clarity of illustration, where appropriate, reference numerals may have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

Figure 1B:
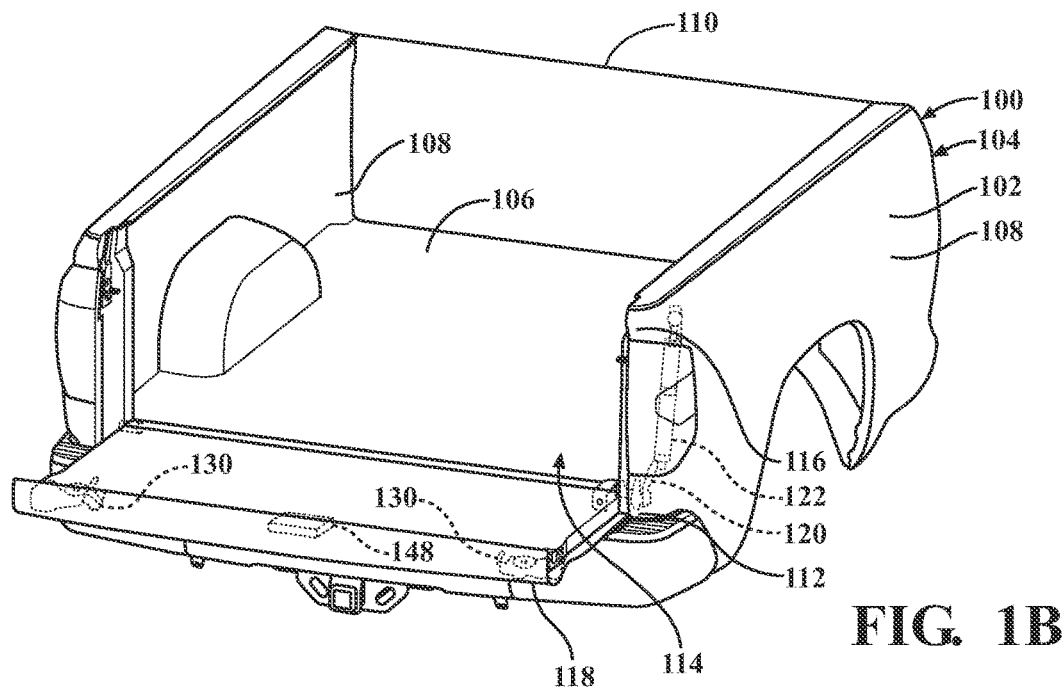
FIG. 1B is a schematic rear perspective view of a vehicle including a truck bed having a tailgate shown in an open position and incorporating a power tailgate system in accordance with an embodiment described herein.

Part of the exemplary passenger vehicle 100 is shown in FIG. 1B. As shown, the vehicle 100 is a pickup truck. The vehicle 100 includes an exterior and several interior compartments. In the illustrated pickup truck configuration of the vehicle 100, the compartments include an open-topped bed 102 for carrying cargo. In addition to the bed 102, the compartments may include a passenger compartment, an engine compartment and the like. Among other things, the vehicle 100 may include seats, a dash assembly, an instrument panel and the like housed in the passenger compartment. In addition, the vehicle 100 may include an engine, a transmission and the like, as well as other powertrain components (such as wheels, for example) housed in the engine compartment and elsewhere in the vehicle 100. The wheels support the remainder of the vehicle 100 on the ground. One or more of the wheels may be powered by the remainder of the powertrain components to drive the vehicle 100 along the ground.

The vehicle 100 may include a body 104 that forms the exterior and defines or otherwise encloses the bed 102 and the other compartments. In relation to the bed 102, the body 104 includes a deck or cargo bed 106, two sidewalls 108, a bulkhead 110 and a rear end 112. At the rear end 112, the body 104 defines a tailgate opening 114. Likewise, the body 104, including but limited to the sidewalls 108, renders surrounding body 116 that frames the tailgate opening 114. The tailgate opening 114 opens between the bed 102 and the exterior. Relatedly, as part of the rear end 112, the body 104 includes a tailgate 118 corresponding to the tailgate opening 114.

Figure 1C:
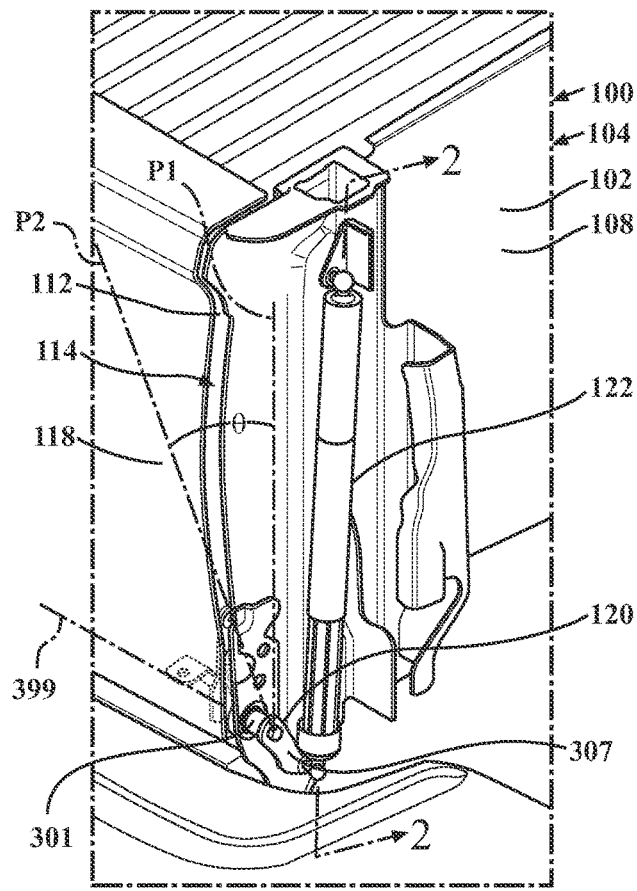
FIG. 1C is a perspective view of a portion of the vehicle of FIG. 1B, showing an actuator, crank, and rotatable element of the power tailgate system mounted in the vehicle.
Figure 1D:
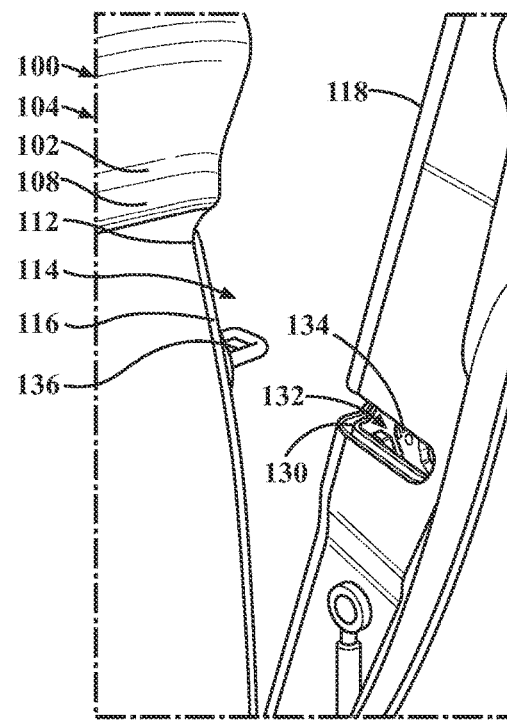
FIG. 1D is a perspective view of a portion of a tailgate and a wall defining the truck bed, showing a tailgate-side latch assembly including a latch for latching the tailgate and a vehicle-side striker for the latch.

As shown with reference to FIGS. 1B and 1C, the tailgate (or "TG") 118 serves as closure panel for the bed 102. The tailgate 118 is pivotally connected to the surrounding body 116 for movement, relative to the tailgate opening 114, between a fully closed, raised, or "up" position and a fully open, lowered, or "down") position through a range of partially-open positions. In FIG. 1C, the tailgate 118 is shown in the fully closed or raised position. In the fully closed position, the tailgate 118 is positioned over the tailgate opening 114, with the periphery of the tailgate 118 adjacent to the surrounding body 116, and the tailgate 118 in alignment with the surrounding body 116. Also, in the fully closed position, the tailgate 118 may be in a position in which it can be secured by one or more latches to maintain the tailgate in a vertical or near-vertical orientation adjacent the sidewalls 108 of the cargo bed, thereby closing off an end of the cargo bed. In FIG. 1B, the tailgate 118 is shown in the fully open or lowered position. In the fully open position, the tailgate 118 is positioned away from the tailgate opening 114, which allows access to the bed 102 from the rear of the vehicle 100. In the fully open position, the tailgate may be supported by cables or other supports to reside in a horizontal or near-horizontal orientation, which facilitates loading and/or removal of cargo. In FIG. 1D, the tailgate 118 is shown in a representative partially-open position. In the partially-open positions, the tailgate 118 is between the fully closed position and the fully open position.

As shown, with reference to FIGS. 1B and 1C, in relation to opening the tailgate 118 and closing the tailgate 118, the vehicle 100 includes a hinge assembly 120, and an in-bed tailgate actuator 122. Serving, at least in part, as a basic hinge, the hinge assembly 120 runs between the bed 102 and the tailgate 118. The hinge assembly 120 connects the tailgate 118 to the bed 102, and thereby supports the tailgate 118 from the bed 102 for rotational movement between the closed position and the open position. The tailgate actuator 122 corresponds to the hinge assembly 120 and may be housed, in whole or in part, in the bed 102. From inside the bed 102, the tailgate actuator 122 is connected to the tailgate 118 through the hinge assembly 120. Although the vehicle 100, as shown, includes one hinge assembly 120, and one tailgate actuator 122, it will be understood that this disclosure is applicable in principle to otherwise similar vehicles including one or more hinge assemblies 120, and one or more tailgate actuators 122.

Referring to FIG. 1C, in one or more arrangements, the hinge assembly 120 may include a rotatable element 301 structured for transmitting rotational force to the tailgate. In one or more arrangements, the rotatable element may be rotary through-bed torque shaft incorporated into the hinge assembly 120 for operable connection with the tailgate. In other arrangements, the rotatable element may be another rotatable portion of the hinge assembly structured for operable connection with the tailgate, depending on the particular hinge assembly design. The rotatable element 301 may be axially aligned with the pivotal movement of the tailgate 118 and supported from the bed 102 for axial rotation. The rotatable element 301 may support the tailgate 118 for rotation about an associated rotatable element rotational axis 399, as shown in FIG. 1C. Moreover, the hinge assembly 120 may also include a pivotal in-bed crank 307 operably connected to the rotatable element 301 along the rotational axis 399 of the rotatable element 301 so that a rotation of the crank 307 produces a corresponding rotation of the rotatable element 301 about the axis 399 (i.e., rotating the crank 307 15° about the rotatable element rotational axis 399 produces a corresponding rotation of the rotatable element 301 15° about the axis). From outside the bed 102, the rotatable element 301 may be connected to and support the tailgate 118 from the bed 102. From inside the bed 102, the tailgate actuator 122 is connected between the bed 102 and the crank 307. Moreover, the bed 102, the tailgate actuator 122 and the crank 307 serially share pivotal connections. The rotatable element 301 may transmit torque and rotation associated with the pivotal movement of the tailgate 118 between the tailgate and the crank 307. The term "operably connected," as used throughout this description, can include direct or indirect connections, including connections without direct physical contact. Similarly, elements described as being "operably connectible" are elements that can be connected directly (through direct physical contact) or indirectly, through other, physically intermediate element(s).

With the bed 102, the tailgate actuator 122 and the crank 307 serially sharing pivotal connections, from between the bed 102 and the crank 307, as the product of extending and retracting as described herein, the tailgate actuator 122 is operable to pivot the crank 307 against the bed 102. With the tailgate 118, the rotatable element 301 and the crank 307 serially sharing rotary connections, as the crank 307 pivots, the rotatable element 301 axially rotates, and, as the rotatable element 301 axially rotates, the tailgate 118 pivotally closes, pivotally opens, and otherwise pivotally moves between the open position and the closed position.

In one or more arrangements, the hinge assembly may be structured as described in pending commonly-owned U.S. patent application Ser. No. 16/883,246, the disclosure of which is incorporated by reference herein in its entirety.

The vehicle 100 may include a tailgate actuator 122. The tailgate actuator 122 may be connected to the vehicle energy system 150 as described herein. Moreover, the tailgate actuator 122 may be connected to the tailgate 118 through the hinge assembly 120 and its rotatable element 301. Through the hinge assembly 120, the tailgate actuator 122 may be operable to open the tailgate 118, close the tailgate 118 and otherwise move the tailgate 118 between the closed position and the open position using electrical energy from the energy system 150. Although the vehicle 100, as shown, includes one tailgate actuator 122, it will be understood that this disclosure is applicable in principle to otherwise similar vehicles including one or more tailgate actuators 122.

Figure 2:
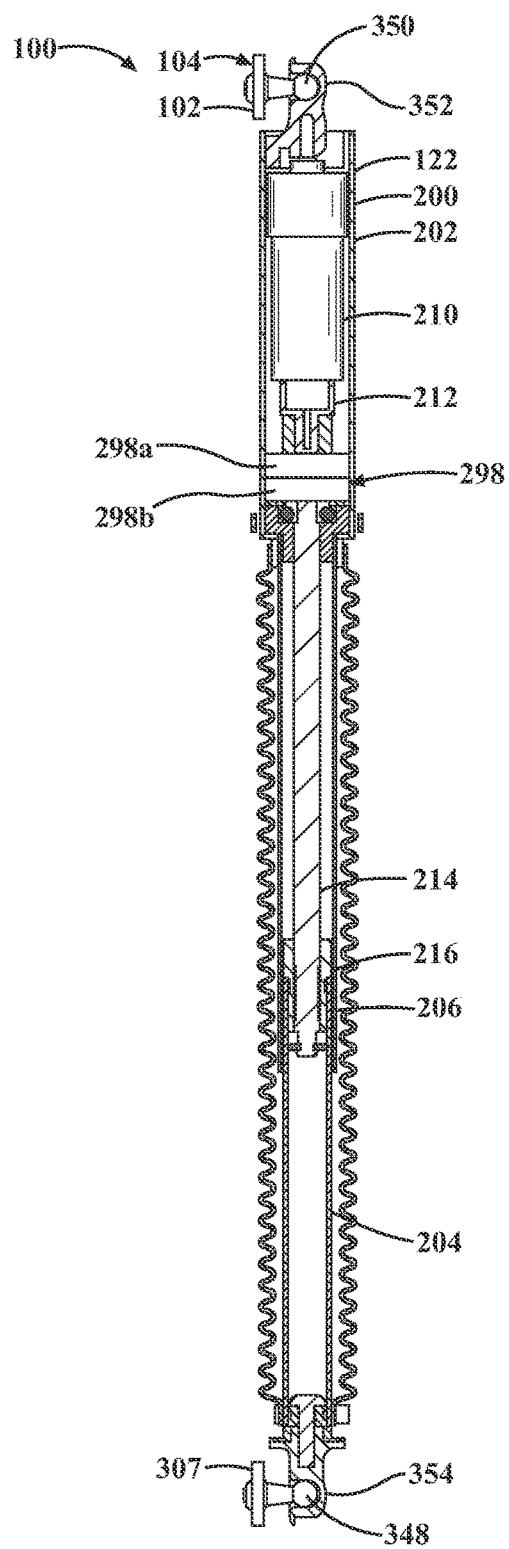
FIG. 2 is a schematic side cross-sectional view of the tailgate actuator taken along the line 2-2 in FIG. 1C, showing the motor, reduction drive, clutch, slide, and other components included as part of the tailgate actuator in an implementation in which the tailgate actuator is a motor-driven spindle drive.

With reference to FIG. 2, in one implementation, the tailgate actuator 122 may be a linear actuator. In particular arrangements, the linear actuator may be in the form of a motor-driven spindle drive operable to extend and retract in a reciprocating motion.

The tailgate actuator 122 may include a two-piece telescoping or otherwise extensible housing 200. The housing 200 may include a tubular base 202, a tubular slide 204, and a sliding overlap 206 therebetween. Inside the housing 200, the tailgate actuator 122 may include axially aligned items for converting rotary movement into linear extension and retraction. The tailgate actuator 122 may include a motor 210, a reduction drive 212, a clutch 298, a rotary screw 214, and a fixed nut 216. The motor 210 and the reduction drive 212 may be secured with the base 202, the nut 216 may be secured with the slide 204, and the screw 214 may run through the nut 216. The base 202 and the nut 216 may support the screw 214 for axial rotation, including powered axial rotation by the motor 210 through the reduction drive 212 and the clutch 298. In one implementation, the reduction drive 212 may be a planetary reduction drive. For instance, the reduction drive 212 may be a multistage planetary reduction drive. In one implementation, the screw 214 may be a ball screw, and the nut 216 may be a ball nut.

In one or more particular arrangements, the reduction drive 212 may be configured so that eighteen motor armature rotations produce one rotation of the portion of the reduction drive operably connected to the clutch (and, therefore, one rotation of the screw 214) (i.e., a conversion ratio of 18:1). Alternatively, conversion ratios other than 18:1 may be used. In addition, the screw 214, slide 204, and nut 216 may be structured such that a single rotation of screw 214 by the reduction drive 212 produces an associated 9-millimeter linear travel of the slide 204, in both the extension direction and the retraction direction.

A motor circuit 203 may be provided for implementing motor switching and other electrical operations of the motor responsive to control commands received from the tailgate control module 323, as shown in FIG. 1A.

As used herein, the term "backdrive" may refer to application of an external force producing a linear movement of the slide 204 which generates a torque in the screw, resulting in an associated rotation of the reduction drive 212 operably connected to the screw and a resulting rotation of an armature (not shown) of the motor 210 operably connected to the reduction drive 212. If the backdrive rotation rate of the armature is above a first predetermined threshold TH1, the motor 210 may be damaged. The external backdriving force may be applied to the slide 204 by applying an external force to the tailgate operably coupled to the slide 204. For example, a user may manually apply an opening or closing force to the tailgate 118, or a load in the cargo bed may bear on the tailgate 118 to apply a force in the opening direction.

In embodiments described herein, to aid in preventing damage to the motor 210 due to backdrive, a clutch 298 may be interposed between (and operably connected to) the reduction drive 212 and the screw 214. A first portion 298a of the clutch 298 may be rigidly attached to a portion of the reduction drive 212 that would otherwise be directly operably connected to the screw 214 to transmit torque to the screw (and to receive torque from the screw). A second portion 298b of the clutch 298 may be rigidly attached to the portion of the screw 214 that would otherwise be directly operably connected to the reduction drive 212 to transmit torque to the reduction drive (and to receive torque from the reduction drive).

The clutch 298 may be structured to transmit torque in either rotational direction from the reduction drive 212 to the screw 214 during normal operations to open and close the tailgate 118. The clutch 298 may also be structured to transmit torque from the screw 214 to the reduction drive 212 when the screw 214 is back-driven by application of an axial load to the slide 204 sufficient to cause a rotation of the motor armature that is below the first predetermined threshold TH1 rotation rate. Also, for situations where the magnitude and/or rate of application of the axial load applied through the slide 204 is sufficient to generate a backdrive torque that rotates the armature at a rate above the first predetermined threshold TH1, the clutch 298 may be structured to "slip" to enable rotational motion of the combination of the screw 214 and the second portion 298*b* of the clutch 298 attached to the screw, independent of (and with respect to) the combination of the first portion 298*a* of the clutch 298 and the portion of the reduction drive 212 attached to the first portion of the clutch. This configuration may act to prevent damage to the motor 210 due to back-driving of the actuator in situations where the applied torque would otherwise cause an armature rotation rate exceeding the first predetermined threshold TH1.

Slippage of the clutch 298 enables the first portion 298*a* of the clutch 298 and the portion of the reduction drive 212 attached thereto to rotate independently of the second portion 298*b* of the clutch 298 and the portion of the screw 214 attached thereto, for as long as the applied torque equals or exceeds the torque level associated with the first predetermined threshold armature rotation rate TH1. In embodiments described herein, the clutch 298 may be structured to slip in either of opposite rotational directions. That is, the second portion 298*b* of the clutch 298 may be structured to slip in the same direction of rotation as the first portion 298*a* of the clutch 298, and may be configured to slip in a direction opposite the direction of rotation of the first portion 298*a* of the clutch 298. The direction of rotation of the first portion of the clutch will depend on the direction in which the motor 210 is turning, to either raise or lower the tailgate. During normal (i.e., non-slip) operation of the tailgate control system to raise and lower the tailgate, the second portion 298*b* of the clutch 298 will rotate in the same direction as the first portion 298*a* of the clutch 298. The direction in which the second portion 298*b* of the clutch slips will depend on the direction of the external force applied to the tailgate, as described herein.

The "slip torque" of the clutch 298 may be a torque at or above which the second portion 298*b* of the clutch will rotationally slip or slide with respect to the first portion 298*a* of the clutch, thereby enabling independent rotation of the combination of the screw 214 and the second portion 298*b* of the clutch 298 attached to the screw 214 with respect to the combination of the first portion 298*a* of the clutch 298 and the portion of the reduction drive 212 attached to the first portion of the clutch. In some embodiments of the clutch 298, the clutch may be adjustable to enable the slip torque to be tailored to the requirements of a specific application or tailgate control system. The slip torque associated with a specified threshold armature rotation rate TH1 may be determined analytically and/or experimentally and the clutch may be adjusted or modified to slip at or close to the desired torque. The desired torque may be defined as a specific value, a value with a tolerance range, or a larger torque value range beyond ordinary mechanical tolerances.

Determination of the first predetermined threshold TH1 needed to prevent motor damage for a given application may be determined by analysis and/or experimentation using known methods, and with reference to the characteristics of the reduction drive 212 and the motor 210.

In one or more arrangements, the clutch 298 may be a friction-based slip clutch structured to "slip" and enable relative rotational motion of the screw with respect to a portion of the reduction drive. Alternatively, any type of clutch suitable for the purposes described herein may be used. One source of clutches suitable for the applications described herein is Dynatect Manufacturing, Inc. of New Berlin, WI.

The motor 210 may be operable to drive the tailgate actuator 122 to extend and retract. The motor 210 may be operable to spin, and thereby power the axial rotation of the screw 214 through the reduction drive 212. As the screw 214 axially rotates, the nut 216 axially moves along the screw 214 and, as the nut 216 axially moves along the screw 214, the base 202 and the slide 204 are alternately drawn apart and drawn together. As the base 202 and the slide 204 are drawn apart, the tailgate actuator 122 is extended. Alternately, as the base 202 and the slide 204 are drawn together, the tailgate actuator 122 is retracted.

From inside the bed 102, the tailgate actuator 122 is configured to reach between the bed 102 and the crank 307. As the product of extending and retracting, the tailgate actuator 122 is operable to pivot the crank 307 against the bed 102. Likewise, to allow the tailgate actuator 122 to extend and retract in association with pivoting the crank 307 against the bed 102, the bed 102, the tailgate actuator 122 and the crank 307 serially share pivotal connections. Accordingly, the bed 102 and the tailgate actuator 122 are configured to make a pivotal connection with one another. Specifically, with reference to FIG. 2, the bed 102 may include a bracket-mounted ball stud 350, the tailgate actuator 122 includes a ball socket 352, and the ball stud 350 and the ball socket 352 are configured to make a ball-and-socket connection with one another. Moreover, the crank 307 and the tailgate actuator 122 are configured to make a pivotal connection with one another. Again, with reference to FIG. 2, the crank 307 includes the ball stud 348, the tailgate actuator 122 includes a ball socket 354, and the ball stud 348 and the ball socket 354 are configured to make a ball-and-socket connection with one another.

As set forth herein, as the product of extending and retracting, the tailgate actuator 122 is operable to pivotally close the tailgate 118, pivotally open the tailgate 118, and otherwise pivotally move the tailgate 118 between the open position and the closed position. As the tailgate 118 is pivotally closed, the associated pivotal movement of the tailgate 118 is against gravity. Likewise, as the tailgate 118 is pivotally opened, the associated pivotal movement of the tailgate 118 is with gravity.

Moreover, as shown with reference to FIG. 1D, the vehicle 100 may include one or more tailgate-side latch assemblies 130. Each latch assembly 130 may include a striker chute 132 and a corresponding latch 134 for latching the tailgate 118. Relatedly, the vehicle 100 may include one or more vehicle-side strikers 136 corresponding to the striker chutes 132 and the latches 134. Each latch assembly 130 is connected to the tailgate 118. Each latch assembly 130 may be housed, in whole or in part, in the tailgate 118. For instance, each latch assembly 130 may be housed in the tailgate 118, and connected to the tailgate 118, as a unitary module. Each striker 136 is connected to the surrounding body 116. Although the vehicle 100, as shown, includes two latch assemblies 130 and two strikers 136, it will be understood that this disclosure is applicable in principle to otherwise similar vehicles including one or more latch assemblies 130 and one or more strikers 136.

For each corresponding striker chute 132, latch 134 and striker 136, the striker chute 132 opens to the tailgate 118 for passing the striker 136 into and out of the tailgate 118. The latch 134 is movable, relative to the striker chute 132, in a latching direction and in an unlatching direction between an unlatching position and a latching position. In FIG. 1D, the latch 134 is shown in the unlatching position. In the unlatching position, the latch 134 aligns with the striker chute 132 for passing the striker 136 into and out of the tailgate 118. In the latching position, the latch 134 crosses the striker chute 132 for capturing the striker 136 within the tailgate 118. Accordingly, the latch 134 latches the tailgate 118 to the surrounding body 116 against the striker 136.

The latch 134 may be activated for non-revertible movement in the latching direction. When the tailgate 118 is being closed, the latch 134 functions as the tailgate 118 is moved to the closed position, and afterward, when the tailgate 118 is in the closed position. With the tailgate 118 in the open position, the latch 134, having previously unlatched the tailgate 118, is in the unlatching position. To close the tailgate 118, the latch 134 is activated for non-revertible movement in the latching direction. As the tailgate 118 is moved to the closed position, the striker 136 passes into the tailgate 118 through the striker chute 132. As it passes into the tailgate 118, the striker 136 moves the latch 134 in the latching direction to the latching position, and the latch 134, unable to move in the unlatching direction to the unlatching position, latches the tailgate 118 to the surrounding body 116 against the striker 136.

In addition, the latch 134 may be deactivated for movement in the unlatching direction. When the tailgate 118 is being opened, the latch 134 functions as the tailgate 118 is moved to the open position. With the tailgate 118 in the closed position, the latch 134, having previously latched the tailgate 118, is in the latching position. To open the tailgate 118, the latch 134 is deactivated for movement in the unlatching direction. As the tailgate 118 is moved to the open position, the striker 136 passes out of the tailgate 118 through the striker chute 132. As it passes out of the tailgate 118, the striker 136, in combination with a bias for movement in the unlatching direction, moves the latch 134 in the unlatching direction to the unlatching position, and the latch 134 unlatches the tailgate 118 from the surrounding body 116 from against the striker 136.

The vehicle 100 may include one or more latch actuators 154 for the latch assemblies 130. Each latch actuator 154 corresponds to a latch assembly 130, and may be housed, in whole or in part, in the tailgate 118. For instance, each latch actuator 154 may be housed in the tailgate 118, and connected to the tailgate 118, as a unitary module with the corresponding latch assembly 130. In one implementation, each latch actuator 154 is a motor-driven reduction drive. In this and other implementations, each latch actuator 154 is connected to the energy system. Moreover, each latch actuator 154 may be connected to the corresponding latch assembly 130. For each corresponding latch assembly 130, latch 134 and latch actuator 154, using electrical energy from the energy system 150, the latch actuator 154 is operable to activate the latch 134 for non-revertible movement in the latching direction, and deactivate the latch 134 for movement in the unlatching direction. Although the vehicle 100, as shown, includes one latch actuator 154 per latch assembly 130, it will be understood that this disclosure is applicable in principle to otherwise similar vehicles including one or more latch actuators 154 per latch assembly 130.

One or more arrangements of the power tailgate system may be structured to enable a command to automatically raise the tailgate 118 from the fully-open position to a half-latched position, which is a near-closed (but not fully closed) position of the tailgate. Latch assemblies 130 of the vehicle 100 may also be structured to maintain the tailgate in the half-latched/near-closed position. Examples of latch assemblies suitable for securing the tailgate in a half-latched position and controllable for the purposes described herein may be found in commonly-owned U.S. patent application Ser. Nos. 17/335,549, 17/335,529, and 17/335,545, the disclosures of which are incorporated herein by reference in their entireties. Other types of latch structures are also contemplated. Exemplary control operations of the tailgate 118 responsive to application of an external force when raising the tailgate to the half-latched position are also described herein.

The vehicle 100 can include one or more processors 144. In one or more arrangements, the processor(s) 144 can be a main processor(s) of the vehicle 100. For instance, the processor(s) 144 can be an electronic control unit (ECU). The vehicle 100 can include one or more data stores 327 for storing one or more types of data. The data store(s) 327 can include volatile and/or non-volatile memory. Examples of suitable data store(s) 327 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 327 can be a component of the processor(s) 144, or the data store(s) 327 can be operably connected to the processor(s) 144 for use thereby.

The one or more data store(s) 327 can include sensor data 331, as shown in FIG. 1A. In this context, "sensor data" means any information about the sensors that the vehicle 100 is equipped with, including the capabilities and other information about such sensors. As will be explained below, the vehicle 100 can include the sensor system 142. The sensor data 331 can relate to one or more sensors of the sensor system 142. As an example, in one or more arrangements, the sensor data 331 can include information on the tailgate position sensor 379 of the sensor system 142. The one or more data store(s) 327 can also include lookup tables 329, as indicated in FIG. 1A, equations, and other information stored to be accessible by sensors of the sensor system 142 and/or the tailgate control module 323 in performing the operations described herein.

In addition, during design, assembly, and/or configuration of the actuator 122, the number of motor rotation edges that will be generated during raising and lowering of the tailgate 118 to various predetermined positions may be determined and stored for purposes described herein. These values may be determined using known methods through testing of the actuator 122, and a nominal or average value assigned to a variable representing the number of motor rotation edges expected to be detected during each given movement of the tailgate. For example, a number of motor rotation edges expected to occur during lowering of the tailgate 118 from the fully closed position to the fully open position may be determined and assigned to the variable "EEO". A number of motor rotation edges expected to occur during raising of the tailgate 118 from the fully open position to the fully closed position may be determined and assigned to the variable "EEC". A number of motor rotation edges expected to occur during raising of the tailgate from the fully open position to a half-latched position may be determined and assigned to the variable "EEH".

In addition, an associated tolerance value may be assigned to each expected number of motor rotation edges to account for slight variations in the number of edges detected during movement of the tailgate 118 between the various predetermined positions during testing. A suitable tolerance value may for each actuator configuration and type of tailgate movement may be determined based on analysis, testing, and/or experimentation. Associated tolerance values TEEO, TEEC, and TEEH may be assigned to the respective variables EEO, EEC, and EEH. Each tolerance value may be defined to encompass the entire range of motor rotation edge values after which the tailgate can be considered to have moved from one position (e.g., fully closed) to another position (e.g., fully open). For example, in one application, it may be determined by experimentation that a tailgate will have been moved from the fully closed position to the fully open position after 100±5 motor rotation edges have been detected. The various values of expected motor rotation edges and associated tolerances may be stored in data stores 327, for example, in lookup tables 329, for comparison with actual numbers of motor rotation edges detected during attempts by the tailgate control system to move the tailgate responsive to user commands, as described herein.

In embodiments described herein, the memory 146 may be a random-access memory (RAM), read-only memory (ROM), a hard-disk drive, a flash memory, or other suitable memory for storing modules, such as the tailgate control module 323. The tailgate control module 323 includes, for example, computer-readable instructions that when executed by the processor 144, cause the processor(s) 144 to perform the various functions disclosed herein. Additional modules (not shown) may also be stored in memory 146. For example, as part of a central control system, the vehicle 100 may include a global control unit (GCU) to with which the tailgate control module 323 is communicatively connected.

The vehicle 100 can include one or more modules, at least some of which are described herein. The module(s) may be stored in memory 146. The modules can be implemented as computer-readable program code that, when executed by processor(s) 144, implement one or more of the various processes described herein. One or more of the modules can be a component of the processor(s) 144, or one or more of the modules can be executed on and/or distributed among other processing systems to which the processor(s) 144 is operably connected. The modules can include instructions (e.g., program logic) executable by one or more processor(s) 144. Alternatively, or in addition, one or more of data store(s) 327 or another portion of the vehicle 100 may contain such instructions.

Generally, a module, as used herein, includes routines, programs, objects, components, data structures, and so on that perform specific tasks or implement particular data types. In further aspects, a memory generally stores the modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include the tailgate control module (TCM) 323. The tailgate control module 323 may be configured to receive tailgate opening and closing commands, and to automatically control opening and closing operations of the tailgate 118. The processors 144, the memory 146 and the tailgate control module 323 as described herein together may serve as a computing device whose control module 323 is employable to orchestrate the operation of the tailgate 118. Specifically, the tailgate control module 323 may control operation of the vehicle systems 140 based on information about the vehicle 100 (including the position and/or speed of the tailgate), received tailgate control signals, and other information. Accordingly, as a prerequisite to operating the tailgate, the control module 323 gathers and/or receives information, including the information about the vehicle 100 detected by the sensor system 142. The control module 323 may also be configured to receive commands from a human user and/or from other modules or elements of the vehicle. The commands may be remotely generated (i.e., generated by a user, system, element, or other entity external to the vehicle). The control module 323 may then evaluate the information and operate the various vehicle systems and elements (including the tailgate 118) based on its evaluation, with a view to controlling operations of the tailgate.

The tailgate control module 323 may include instructions that when executed by the processor(s) 144 cause the processor(s) 144 to, responsive to an input from a user, control operation of the motor 210 to attempt to lower or raise the tailgate 118. The input from the user may be the pushing of a suitable button mounted in the vehicle or on a key fob, for example. The user input may generate a command instructing the tailgate control module 323 to control the motor 210. The tailgate control module 323 may also include instructions to determine whether the clutch 298 slipped by at least a predetermined slip amount during operation of the motor 210 to attempt to lower or raise the tailgate 118. The tailgate control module 323 may also include instructions to, responsive to a determination that the clutch slipped by at least the predetermined slip amount during operation of the motor 210 to attempt to lower or raise the tailgate 118, generate an alert indicating a need for manual reset of the tailgate.

Alerts and generated signals indicating the need for a manual reset of the tailgate 118 may be in any of a variety of forms, including audible alerts, visual alerts, or a combination thereof. The alert(s) may be conveyed via a display screen, an audible alarm mounted on the vehicle, through a cellular device of the user, or by any other suitable means.

The "predetermined slip amount" may be an amount of slip which will cause the difference between an expected number of motor rotation edges to perform a command and an actual number of motor rotation edges detected when attempting to perform the command, to equal or exceed the tolerance value attached to the expected number of motor rotation edges. Ideally, the actual number of motor rotation edges detected when attempting to perform the movement command should be within the tolerance range of the number of motor rotation edges expected to be detected when performing the movement command. This condition should be satisfied when there is little or no clutch slip during tailgate movement, because the tolerance range may encompass all values of the expected number of motor rotation edges that will bring the tailgate into a desired position.

Any amount of clutch slippage will disrupt the rotational synchronization of the screw 214 with the reduction drive 212, resulting in a difference between the number of motor rotation edges actually detected in moving the tailgate to a desired position, and the number of motor rotation edges expected to be detected when moving the tailgate to the desired position. In cases where clutch slippage is very minor, difference in the number of motor edge rotations may be within the tolerance of the expected number of rotations. However, in cases where the clutch slips excessively due to application of an external force, the tailgate 118 may either fail to reach a desired position, or the tailgate may reach the desired position sooner than would be indicated by the expected number of motor rotation edges required to make the required movement. In such cases, a manual reset of the tailgate system may be necessary in order for the tailgate to function automatically in response to user commands. These principles are illustrated in FIGS. 4A-7B.

Figure 4A:
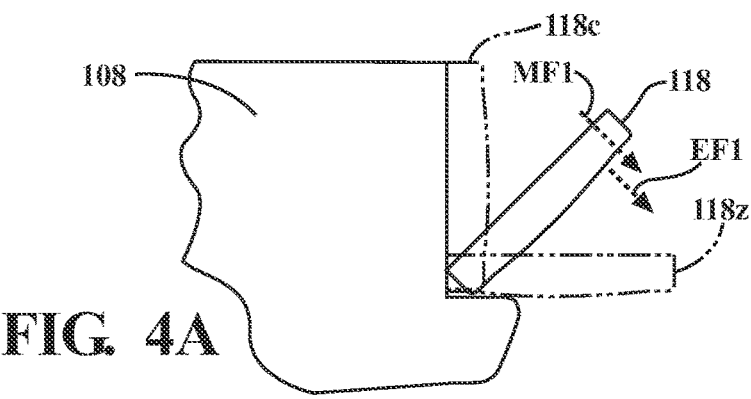
FIGS. 4A-4C are schematic views illustrating a first possible end-use situation of the tailgate, and an associated operating mode for controlling operation of the tailgate in the first possible end-use situation.
Figure 4B:
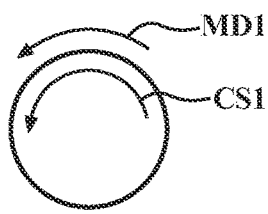

FIG. 4A is a schematic side view of a rear portion of the vehicle 100 showing fully closed (118*c*), fully open (118*z*), and intermediate positions of a tailgate 118. In FIG. 4A, the tailgate 118 is acted on by an opening force MF1 generated by the motor 210 and an external force EF1 acting in a direction that promotes opening of the tailgate 118. FIG. 4B is a schematic view illustrating an opening direction of rotation MD1 of the first portion 298*a* of the clutch 298 connected to the reduction drive 212, and a direction CS1 in which the second portion 298*b* of the clutch 298 would slip if the applied force EF1 becomes excessive. In this case, if the clutch 298 slips excessively in the direction of CS1, the tailgate 118 may travel from the fully closed position 118*c* to the fully open position 118*z* after fewer motor rotation edges than expected, because the tailgate is moving downwardly faster than the motor 210 is attempting to lower it.

Figure 7A:
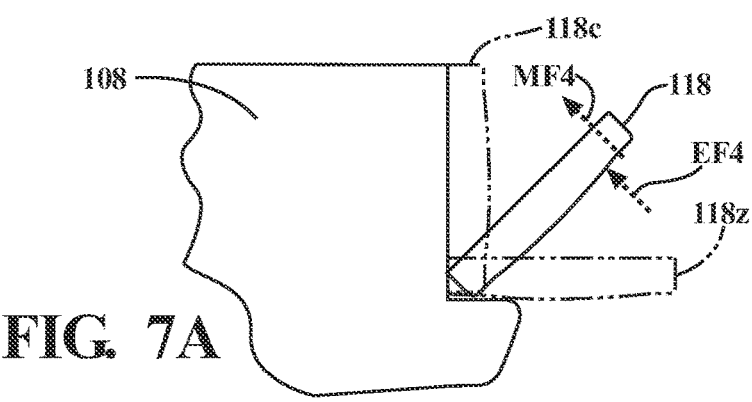
FIGS. 7A-7C are schematic views illustrating a fourth possible end-use situation of the tailgate, and an associated operating mode for controlling operation of the tailgate in the fourth possible end-use situation.
Figure 7B:
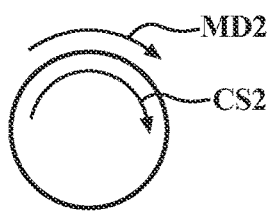

A similar situation is shown in FIGS. 7A-7B. FIG. 7A is a schematic side view of a rear portion of the vehicle 100 showing fully closed (118*c*), fully open (118*z*), and intermediate positions of a tailgate 118. The tailgate is acted on by a closing force MF4 generated by the motor 210 and an external force EF4 acting in a direction that promotes closing of the tailgate 118. FIG. 4B is a schematic view illustrating a closing direction of rotation MD2 of a first portion 298*a* of the clutch 298 connected to the reduction drive 212, and a direction CS2 in which the second portion 298*b* of the clutch 298 would slip if the applied force EF4 becomes excessive. In this case, if the clutch slips excessively in the direction of CS2, the tailgate 118 may travel from the fully open position 118*z* to the fully closed position 118*c* after fewer motor rotation edges than expected, because the tailgate is moving toward the closed position faster than the motor 210 is attempting to raise it.

Figure 5A:
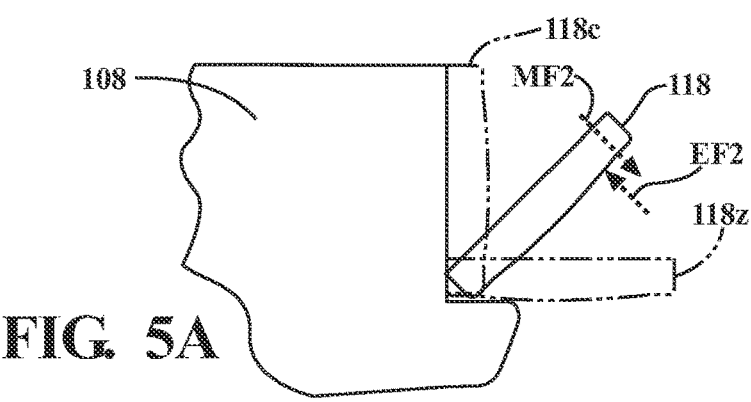
FIGS. 5A-5C are schematic views illustrating a second possible end-use situation of the tailgate, and an associated operating mode for controlling operation of the tailgate in the second possible end-use situation.
Figure 5B:
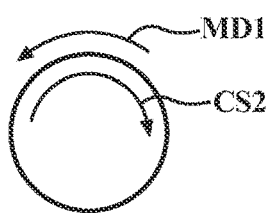

A different possible situation is shown in FIGS. 5A-5B. FIG. 5A is a schematic side view of a rear portion of the vehicle 100 showing fully closed (118*c*), fully open (118*z*), and intermediate positions of a tailgate 118. The tailgate is acted on by an opening force MF2 generated by the motor 210 and an external force EF2 acting in a direction that opposes opening of the tailgate 118. FIG. 5B is a schematic view illustrating an opening direction of rotation MD1 of a first portion 298*a* of the clutch 298 connected to the reduction drive 212, and a direction CS2 in which the second portion 298*b* of the clutch 298 would slip if the applied force EF2 becomes excessive. In this case, if the clutch slips excessively in the direction of CS2, the tailgate 118 may fail to reach the desired fully open position, because the force EF2 and clutch slippage are great enough to prevent downward motion of the tailgate while the motor 210 is running. Thus, the motor may reach the expected number of motor rotation edges before the tailgate reaches the fully open position 118*z*.

Figure 6A:
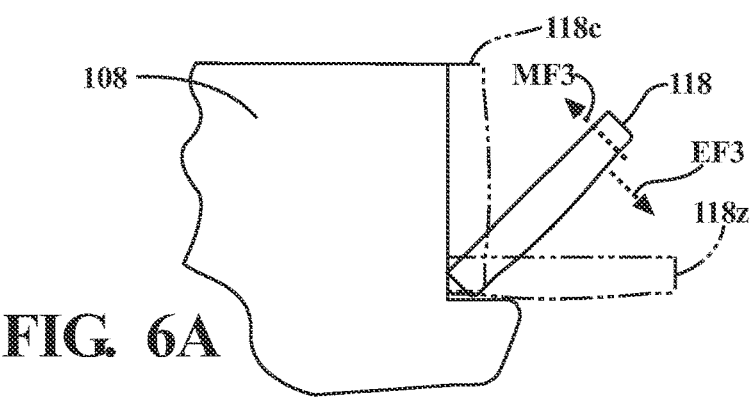
FIGS. 6A-6C are schematic views illustrating a third possible end-use situation of the tailgate, and an associated operating mode for controlling operation of the tailgate in the third possible end-use situation.
Figure 6B:
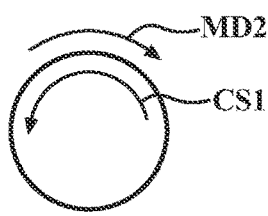

A similar situation is shown in FIGS. 6A-6B. FIG. 6A is a schematic side view of a rear portion of a pickup showing fully closed (118*c*), fully open (118*z*), and intermediate positions of a tailgate 118. The tailgate is acted on by a closing force MF3 generated by the motor 210 and an external force EF3 acting in a direction that opposes closing of the tailgate 118. FIG. 6B is a schematic view illustrating a closing direction of rotation MD2 of a first portion 298*a* of the clutch 298 connected to the reduction drive 212, and a direction CS1 in which the second portion 298*b* of the clutch 298 would slip if the applied force EF3 becomes excessive. In this case, if the clutch slips excessively in the direction of CS1, the tailgate 118 may fail to reach the desired fully closed position, because the force EF3 and clutch slippage are great enough to prevent upward or closing motion of the tailgate while the motor is running. Thus, the motor may reach the expected number of motor rotation edges before the tailgate reaches the fully closed position 118*c*.

The "predetermined slip amount" for each of the above situations may be an amount of slip which causes an associated desynchronization of the screw and the reduction drive severe enough to prevent the desired position of the tailgate 118 from being reached during normal motorized operation. The "predetermined slip amount" for each condition may be determined analytically and/or experimentally for a given tailgate control system configuration.

In one or more arrangements, the tailgate control system must be reset by manually returning or "resetting" the tailgate 118 to the fully closed position before the tailgate can be operated again automatically.

In one operational mode, to enable manual resetting of the tailgate, the tailgate control module 323 may include instructions that, when executed by the processor(s) 144, cause the processor(s) 144 to, simultaneously with or following generating the alert, control operation of the power tailgate system to power down the motor 210. Controlling operation of the power tailgate system to "power down" the motor 210 may comprise controlling operation of the system to interrupt or prevent a flow of electrical current to the motor, to halt operation of the motor. A user may then manually rotate the tailgate 118 back to the fully closed condition. During this manual movement of the tailgate 118, the clutch 298 may slip as previously described without backdriving the elements of the reduction drive 212 and motor 210.

In particular arrangements, the tailgate control module 323 may include instructions that, when executed by the processor(s) 144, cause the processor(s) to enable a user to select a motor "power-down" mode to be automatically implemented simultaneously with (or following) generation of the alert indicating a need for manual reset of the tailgate 118. For example, the input system 156 may be configured to enable user selection of the "power-down" operation mode to be implemented by the tailgate control module 323.

In one exemplary user-selectable "power-down" mode, the tailgate control module 323 may include instructions that, when executed by the processor(s) 144 cause the processor to, simultaneously with generation of the alert indicating a need for manual reset of the tailgate, automatically power down the motor 210. In another exemplary user-selectable "power-down" mode, the tailgate control module 323 may include instructions that, when executed by the processor(s) 144, cause the processor(s) to automatically power down the motor 210 after passage of a predetermined time period following generation of the alert indicating a need for manual reset of the tailgate 118. In yet another exemplary user-selectable "power-down" mode, the tailgate control module 323 may include instructions that, when executed by the processor(s) 144, cause the processor(s) to wait for the user to generate a separate motor "power-down" command following generation of the alert indicating a need for manual reset of the tailgate 118. The tailgate control module 323 may also include instructions that, when executed by the processor(s) 144, cause the processor(s) to, upon receipt of the user-generated "power-down" command, power down the motor 210.

In one or more arrangements, manual reset of the tailgate 118 may involve disengaging the motor 210 from the tailgate 118. To this end, the tailgate control module 323 may include instructions to automatically disengage the motor 210 and the tailgate 118 to enable manual reset of the tailgate 118, determine when the manual reset of the tailgate is complete and, responsive to the manual reset of the tailgate being complete, automatically engage the motor 210 with the tailgate 118.

The motor 210 and the tailgate 118 may be considered "engaged" when the motor and the tailgate 118 are operably connected by elements interposed between the motor and the tailgate, to enable torque to be transmitted by the motor to the tailgate 118 and from the tailgate to the motor. The motor 210 and the tailgate 118 may be considered "disengaged" when the motor and the tailgate are not operably connected by elements interposed between the motor and the tailgate, such that torque cannot be transmitted by the motor to the tailgate and torque cannot be transmitted from the tailgate to the motor. Manual reset of the tailgate 118 may also include manually manipulating the tailgate to the fully closed position of the tailgate so that the latches may engage and to activate switches or sensors (such as tailgate position sensor 379, as shown in FIG. 1A) indicating that the tailgate is in the fully closed position and is thus reset. The tailgate control module 323 may determine that manual reset is complete when the motor 210 and the tailgate 118 are re-engaged after closing of the tailgate 118.

In one or more arrangements, disengagement of the tailgate 118 from the motor 210 may be implemented by interposing one or more automatically actuatable clutches into the torque transmission chain between the motor and the tailgate. For example, in one or more particular arrangements, disengagement and re-engagement of the motor 210 with the tailgate 118 may be implemented using a clutch structured to be automatically actuatable responsive to commands from the tailgate control module 323 as executed by the processor(s) 144. The automatically actuatable clutch may be engaged/disengaged by an actuator (e.g., an electric or hydraulic actuator) controllable by instructions stored in the tailgate control module 323 and executable by the processor(s) 144.

In particular arrangements, the clutch may be an electrically-actuatable clutch (such as an electromagnetic clutch). However, any suitable clutch may be used provided it is controllable by the tailgate control module 323 to operably engage and disengage the motor from the tailgate for purposes of enabling and preventing raising and lowering of the tailgate by operation of the motor as described herein.

Figure 8:
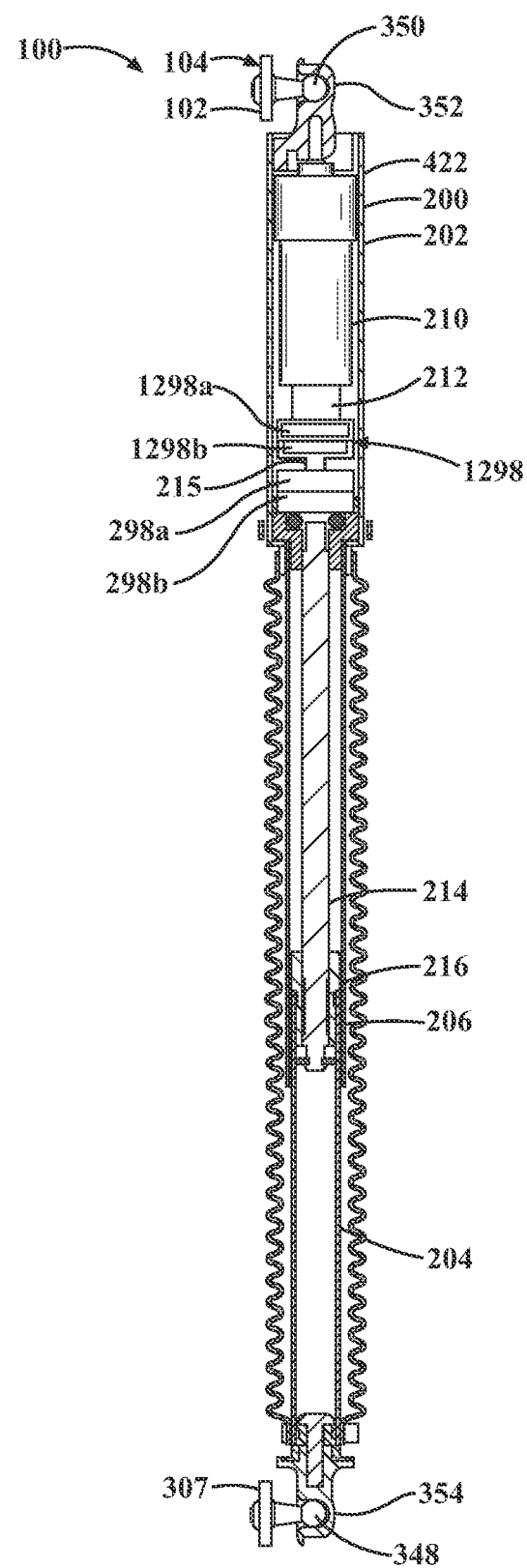
FIG. 8 is a schematic side cross-sectional view (similar to the view shown in FIG. 2) of another embodiment of the tailgate actuator.

One example 1298 of an electrically-actuatable clutch is shown schematically in FIG. 8. FIG. 8 is a schematic side cross-sectional view (similar to the view shown in FIG. 2) of another embodiment 422 of the tailgate actuator. Elements of actuator 422 which are the same as elements used in actuator 122 have been given the same reference numerals.

As seen from FIG. 8, actuator 422 may be substantially similar to actuator 122, the main difference being the incorporation of a second, automatically actuatable clutch 1298 interposed between reduction drive 212 and slip clutch 298. In one or more arrangements, the automatically actuatable clutch 1298 is an electromagnetic clutch configured to operate in a manner opposite that of a conventional electromagnetic clutch. That is, the clutch 1298 may be configured to engage to enable transmission of torque through the clutch when the electromagnet is unenergized and to disengage (thereby preventing transmission of torque through the clutch) when a current is applied to energize the electromagnet. For example, the second clutch 1298 may include a first portion 1298a rigidly attached to a portion of the reduction drive 212 that would otherwise be directly operably connected to the screw 214 to transmit torque to the screw (and to receive torque from the screw). "Rigidly attached" as used herein means that the first portion 1298a and the portion of the reduction drive are attached so as to rotate together, by the same angular amount, when one or the other of the first portion 1298a and the portion of the reduction drive is rotated. The second clutch 1298 may also include a second portion 1298b rigidly attached to the first portion 298a of the previously described slip clutch 298, at a connection 215. The second clutch 1298 is also structured so that the first portion 1298a may be non-slippably engaged with the second portion 1298b for transmission of torque between the motor 210 and the screw 214 (i.e., the clutch may be structured so that torque is transmitted between the motor 210 and the screw 214 by the clutch 1298 without slip when the first portion 1298a is in direct physical contact with the second portion 1298b). The clutch 1298 may also be structured so that the first portion 1298a may be disengaged (i.e., separated) from second portion 1298b so that the first portion cannot transmit torque to (or receive torque from) the second portion 1298b.

In a particular arrangement, the clutch 1298 may be an electromagnetic clutch in which first portion 1298a may be moved out of contact with (or disengaged from) second portion 1298b by energizing an electromagnet (not shown) incorporated into the clutch. Activation of the electromagnet may magnetically attract the clutch first portion 1298a to draw the first portion away from the second portion 1298b. To re-engage the clutch first and second portions 1298a, 1298b and enable transmission of torque through the clutch 1298, the clutch may be provided with suitable spring members (not shown) which bias the first portion 1298a into contact with the second portion 1298b. The spring forces generated should be sufficient to maintain non-slip contact between the second clutch first and second portions 1298a, 1298b during operation of the motor 210 to raise and lower the tailgate 118. Also, the attractive force generated by the electromagnet(s) should be sufficient to overcome the forces exerted on the clutch first portion 1298a by the biasing springs.

In operation, when the clutch 1298 is energized responsive to instructions from the tailgate control module 323, clutch first portion 1298a is moved out of contact with clutch second portion 1298b, thereby disengaging the motor 210 and the screw 214 to prevent torque transmission between motor 210 and screw 214. The tailgate 118 may then be manually reset to the closed position without moving elements of the reduction drive 212 and motor 210. After it is determined that the tailgate has been manually reset, the clutch 1298 may be de-energized to "unpower" the clutch, thereby deactivating the electromagnet(s). This allows the clutch biasing springs to move the clutch first portion 1298a back into contact with clutch second portion, thereby enabling transmission of torque between the motor 210 and the screw 214.

In the embodiment shown in FIG. 8, the slip clutch 298 may operate as previously described herein with respect to FIGS. 2 and 4A-7B.

Figure 9A:
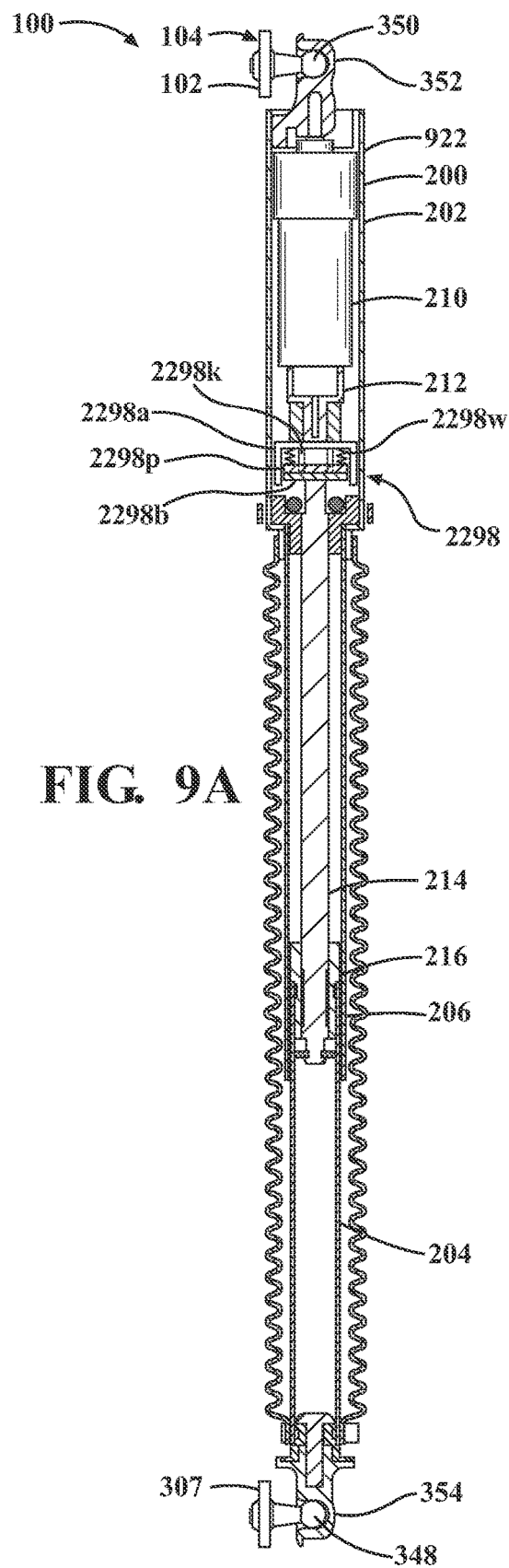
FIG. 9A is a schematic side cross-sectional view (similar to the view shown in FIG. 2) of yet another embodiment of the tailgate actuator, showing an integrated clutch in an engaged condition.
Figure 9B:
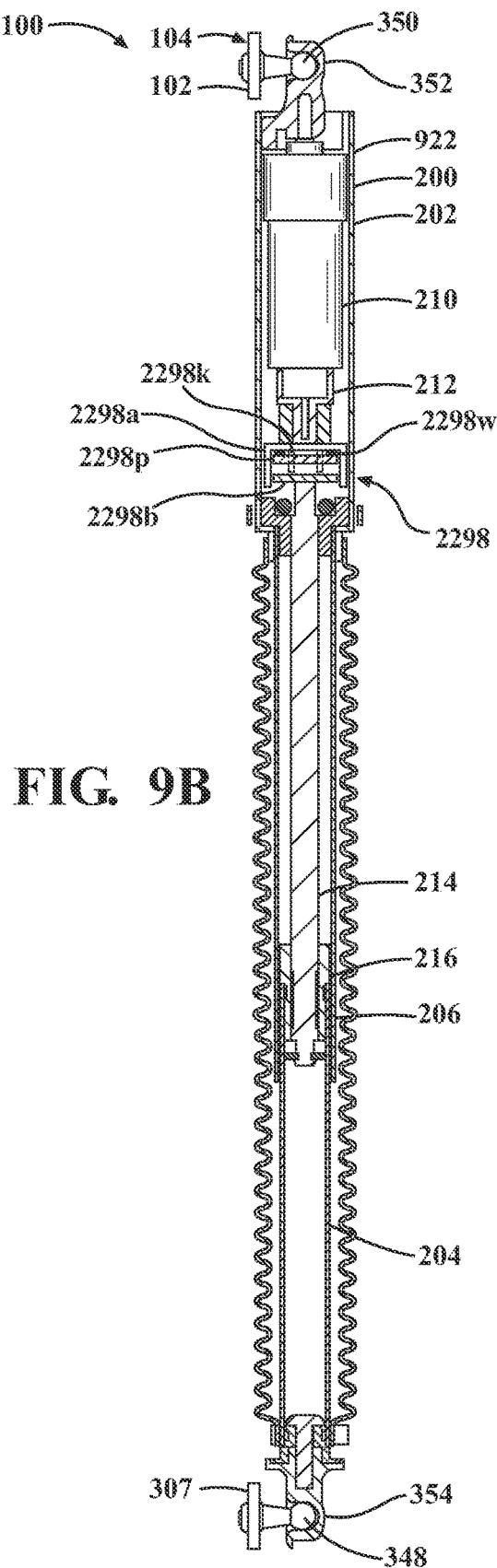
FIG. 9B is a view of a portion of the actuator shown in FIG. 9A, showing the integrated clutch in a disengaged condition

Another example 2298 of an automatically-actuatable clutch is shown in FIGS. 9A and 9B. FIG. 9A is a schematic side cross-sectional view (similar to the view shown in FIG. 2) of another embodiment 922 of the tailgate actuator, showing an integrated clutch 2298 in an engaged condition. FIG. 9B is a view of a portion of the actuator 922 shown in FIG. 9A, showing the integrated clutch 2298 in a disengaged condition. Elements of actuator 922 which are the same as elements used in actuator 122 have been given the same reference numerals. As seen from FIG. 9A, actuator 922 may be substantially similar to actuator 122, the main difference being that the slippable clutch function is incorporated into an integrated clutch 2298 interposed between reduction drive 212 and the screw 214. The clutch 2298 is "integrated" in that it is structured to perform the function of the slip clutch 298 previously described and also to enable selective engagement/disengagement as seen in the previously described automatically actuatable clutch 1298.

In one or more arrangements, the integrated clutch 2298 may be operably connected to the motor 210 and the tailgate 118. Generally, the automatically actuatable clutch 2298 may include a first portion operably connected to the motor 210 and a second portion operably connected to the tailgate 118. The clutch 2298 may be structured to provide non-slippable torque transmission between the motor 210 and the clutch first portion. The clutch 2298 also including a mechanism structured to be engageable to enable slippable torque transmission between the motor 210 and the clutch second portion and disengageable to prevent torque transmission between the motor 210 and the clutch second portion. Then, automatically disengaging the motor from the tailgate may be performed by operating the clutch 2298 to disengage the mechanism to prevent torque transmission between the motor 210 and the clutch second portion.

For example, in the particular embodiment shown in FIGS. 9A-9B, integrated clutch 2298 may include a first portion or housing 2298a rigidly attached to a portion of the reduction drive 212 that would otherwise be directly operably connected to the screw 214 to transmit torque to the screw (and to receive torque from the screw). "Rigidly attached" means that the housing 2298a and the portion of the reduction drive are attached so as to rotate together, by the same angular amount, when one or the other of the housing 2298a and the portion of the reduction drive are rotated. The housing 2298a may define a cavity 2298s structured for positioning a movable clutch plate 2298p therein. The clutch first portion 2298a may be operably connected to the motor 210 via attachment to the reduction gear.

The integrated clutch 2298 may also include a second portion 2298b rigidly attached to the screw 214. The clutch second portion 2298b may be operably connected to the tailgate 118 via the attachment to the screw 214.

Clutch plate 2298p may be movably positioned inside the housing 2298a. The clutch plate 2298p may be structured so as to rotate together with the integrated clutch first portion 2298a. The clutch plate 2298p may also be movable to engage the clutch second portion 2298b to enable slippable transmission of torque between the motor 210 and the tailgate 118 during rotation of the integrated clutch first portion 2298a. The clutch plate 2298p may also be movable to disengage from the integrated clutch second portion 2298b to prevent transmission of torque between the motor 210 and the tailgate 118. In one particular arrangement, the clutch plate 2298p may be movable within the housing cavity 2298s along splines 2298k formed along interior surfaces of the housing. The splines 2298k may engage associated spline-receiving notches (not shown) formed along the outer edges of the clutch plate 2298p. The splines may enable movement of the clutch plate 2298p within the housing 2298a in directions toward and away from the clutch second portion 2298b, while also ensuring that the clutch plate always rotates together with the integrated clutch first portion 2298a.

In a particular arrangement, the clutch 2298 may be an electromagnetic clutch in which the clutch plate 2289p may be moved out of contact with (or disengaged from) clutch second portion 2298b by energizing an electromagnet (not shown) incorporated into the clutch. Activation of the electromagnet may magnetically attract the clutch plate 2298p to draw the clutch plate away from the clutch second portion 2298b. To re-engage the clutch plate 2298p with the clutch second portion 2298b to enable transmission of torque through the clutch 2298, the clutch may be provided with suitable spring members 2298w which bias the clutch plate 2298p into contact with the clutch second portion 2298b for slippable torque transmission. The spring forces generated should be sufficient to maintain the desired slippable contact between the clutch plate 2298p and the clutch second portion 2298b. Also, the attractive force generated by the electromagnet(s) should be sufficient to overcome the forces exerted on the clutch plate 2298p by the biasing springs.

Referring to FIGS. 9A and 9B, in operation, when the clutch 2298 is energized responsive to instructions from the tailgate control module 323, clutch plate 2298p is moved out of contact (FIG. 9A) with clutch second portion 2298b, thereby preventing torque transmission between motor 210 and screw 214 and disengaging the motor 210 and the screw 214. The tailgate 118 may then be manually reset to the closed position without moving elements of the reduction drive 212 and motor 210. After it is determined that the tailgate 118 has been manually reset, the clutch 2298 may be de-energized responsive to instructions from the tailgate control module 323 to "unpower" the clutch (FIG. 9A), thereby deactivating the electromagnet(s). This allows the clutch biasing springs 2298w to move the clutch plate 2298p back into contact with clutch second portion 2298b, thereby enabling transmission of torque between the motor 210 and the screw 214.

In one or more arrangements, the tailgate control module 323 may include instructions that when executed by the processor(s) 144 cause the processor(s) 144 to control operation of the motor 210 to attempt to lower the tailgate 118 from a fully closed position to a fully open position. The tailgate control module 323 may include instructions to determine if the tailgate 118 is in the fully open position. The tailgate control module 323 may include instructions to, responsive to a determination that the tailgate 118 is in the fully open position, discontinue operation of the motor 210 to attempt to lower the tailgate. The tailgate control module 323 may include instructions to determine a difference between a number of motor rotation edges (EEO) expected to occur during operation of the motor to lower the tailgate 118 from the fully closed position to the fully open position, and a number of motor rotation edges (EA1) that occurred during operation of the motor to attempt to lower the tailgate 118 from the fully closed position to the fully open position. The tailgate control module 323 may include instructions to, if the difference between EEO and EA1 is greater than or equal to a predetermined tolerance value TEEO assigned to EEO, determine that the clutch 298 slipped by at least the predetermined slip amount.

In certain arrangements described herein, the actual number of motor rotation edges detected during operation of the motor 210 to attempt to lower or raise the tailgate 118 may be used in determining the amount of clutch slippage. The tailgate control module 323 may include instructions to record the actual number of motor rotation edges detected during operation of the motor 210 to attempt to lower or raise the tailgate 118. This actual number of motor rotation edges may be stored in a memory.

In certain arrangements described herein, the tailgate 118 may be subjected to an external force during at least a portion of operation of the motor 210 to attempt to lower the tailgate, and the externally-applied force may act in a direction that promotes lowering of the tailgate 118. In such cases, slippage of the clutch 298 by at least the predetermined slip amount may be produced by the externally-applied force.

In one or more arrangements, the tailgate control module 323 may include instructions that when executed by the processor(s) 144 cause the processor(s) 144 to control operation of the motor 210 to attempt to lower the tailgate 118 from a fully closed position to a fully open position. The tailgate control module 323 may include instructions to determine if a number (EEO) of motor rotation edges expected to occur during operation of the motor to lower the tailgate 118 from the fully closed position to the fully open position has been reached. The tailgate control module 323 may include instructions to, responsive to a determination that the number of motor rotation edges expected to occur during operation of the motor to lower the tailgate 118 from the fully closed position to the fully open position has been reached, determine if the tailgate has reached the fully open position. The tailgate control module 323 may include instructions to, responsive to a determination that the tailgate 118 has not reached the fully open position, determine that the clutch 298 slipped by at least the predetermined slip amount.

The tailgate control module 323 may include instructions that when executed by the processor(s) 144 cause the processor(s) 144 to control operation of the motor 210 to attempt to lower the tailgate 118 from a fully closed position to a fully open position. The tailgate control module 323 may also include instructions to determine if the tailgate 118 has returned to the fully closed position during operation of the motor 210 to attempt to lower the tailgate from the fully closed position to the fully open position. The tailgate control module 323 may also include instructions to, responsive to a determination that the tailgate 118 returned to the fully closed position, determine that the clutch 298 slipped by at least the predetermined slip amount (i.e., if the external force was severe enough to return the tailgate to the fully closed position after the motor had moved the tailgate out of the fully closed position in an attempt to open the tailgate, it may be determined that the clutch slippage was severe enough to require manual reset of the tailgate system).

In certain arrangements described herein, the tailgate 118 may be subjected to an externally-applied force during at least a portion of operation of the motor 210 to attempt to lower the tailgate, and the externally-applied force may act in a direction that opposes lowering of the tailgate 118. In such cases, slippage of the clutch 298 by at least the predetermined slip amount may be produced by the externally-applied force.

In one or more arrangements, the tailgate control module 323 may include instructions that when executed by the processor(s) 144 cause the processor(s) 144 to control operation of the motor 210 to attempt to raise the tailgate 118 from a fully open position to a fully closed position. The tailgate control module 323 may also include instructions to determine if a number EEC of motor rotation edges expected to occur during operation of the motor to raise the tailgate 118 from the fully open position to the fully closed position has been reached. The tailgate control module 323 may also include instructions to, responsive to a determination that the number of motor rotation edges expected to occur during operation of the motor to raise the tailgate 118 from the fully open position to the fully closed position has been reached, determine if the tailgate has reached the fully closed position. The tailgate control module 323 may also include instructions to, responsive to a determination that the tailgate 118 has not reached the fully closed position, determine that the clutch 298 slipped by at least the predetermined slip amount.

The tailgate control module 323 may include instructions that when executed by the processor(s) 144 cause the processor(s) 144 to control operation of the motor 210 to attempt to raise the tailgate 118 from a fully open position to a fully closed position. The tailgate control module 323 may also include instructions to determine if the tailgate 118 returned to the fully open position during operation of the motor 210 to attempt to raise the tailgate from the fully open position to the fully closed position. The tailgate control module 323 may also include instructions to, responsive to a determination that the tailgate 118 has returned to the fully open position, determine that the clutch 298 slipped by at least the predetermined slip amount (i.e., if the external force was severe enough to return the tailgate to the fully open position after the motor has moved the tailgate out of the fully open position in an attempt to close the tailgate, it may be determined that the clutch slippage was severe enough to require manual reset of the system).

In certain arrangements described herein, the tailgate 118 may be subjected to an externally-applied force during at least a portion of operation of the motor 210 to attempt to raise the tailgate, and the externally-applied force may act in a direction that opposes raising of the tailgate 118. In such cases, slippage of the clutch 298 by at least the predetermined slip amount may be produced by the externally-applied force.

In one or more arrangements, the tailgate control module 323 may include instructions that when executed by the processor(s) 144 cause the processor(s) 144 to control operation of the motor 210 to attempt to raise the tailgate 118 from a fully open position to a fully closed position. The tailgate control module 323 may also include instructions to, during operation of the motor 210 to attempt to raise the tailgate 118, determine if the tailgate is currently in a fully closed position. The tailgate control module 323 may also include instructions to, responsive to a determination that tailgate 118 is currently in the fully closed position, discontinue operation of the motor 210 to attempt to raise the tailgate. The tailgate control module 323 may also include instructions to determine a difference between a number (EEC) of motor rotation edges expected to occur during operation of the motor 210 to raise of the tailgate 118 from the fully open position to the fully closed position, and a number (EA4) of motor rotation edges that occurred during operation of the motor to attempt to raise the tailgate from the fully open position to the fully closed position. The tailgate control module 323 may also include instructions to, if the difference is greater than or equal to a predetermined tolerance value, determine that the clutch 298 slipped by at least the predetermined slip amount.

The tailgate control module 323 may include instructions that when executed by the processor(s) 144 cause the processor(s) 144 to determine when a backdrive condition is occurring in the motor 210 responsive to application of an externally-applied force to the tailgate 118 when the tailgate is in a fully open position, and when the externally-applied force is acting so as to promote raising of the tailgate. The tailgate control module 323 may also include instructions to, responsive to an occurrence of a backdrive condition in the motor when the tailgate 118 is in the fully open position, control operation of the motor to attempt to raise the tailgate. The tailgate control module may be configured to interpret the occurrence of a backdrive condition when the tailgate is fully open as an intention of the user to automatically raise the tailgate.

The tailgate control module 323 may include instructions that when executed by the processor(s) 144 cause the processor(s) 144 to control operation of the motor 210 to attempt to raise the tailgate 118 from a fully open position to a half-latched position. This may be in response to a command from a user to raise the tailgate 118 to the half-latched position. The tailgate control module 323 may also include instructions to, during operation of the motor 210 to attempt to raise the tailgate, determine if the tailgate is currently in the half-latched position. The tailgate control module 323 may also include instructions to, responsive to a determination that the tailgate 118 is currently in the half-latched position, determine if the tailgate has been in the half-latched position for at least a time equal to a predetermined time period. The tailgate control module 323 may also include instructions to, responsive to a determination that the tailgate 118 has been in the half-latched position for at least a time equal to a predetermined time period, determine a difference between a number (EEH) of motor rotation edges expected to occur during raising of the tailgate 118 from the fully open position to the half-latched position, and a number (EEA) of motor rotation edges that occurred during operation of the motor 210 to attempt raise the tailgate from the fully open position to the half-latched position. The tailgate control module 323 may also include instructions to, if the difference is greater than or equal to a predetermined tolerance value, determine that the clutch 298 lipped by at least the predetermined slip amount.

In certain arrangements described herein, the tailgate 118 may be subjected to an externally-applied force during at least a portion of operation of the motor 210 to attempt to raise the tailgate, and the externally-applied force may act in a direction that promotes raising of the tailgate 118. In such cases, slippage of the clutch 298 by at least the predetermined slip amount may be produced by the externally-applied force.

The processor(s) 144, the tailgate control module 323, and the memory 146 can be operably connected to communicate with each other and with the other elements of the vehicle, including various vehicle systems 140 and/or individual components thereof.

Referring again to FIG. 1A, a sensor fusion algorithm 325 may be an algorithm (or a computing device storing an algorithm) configured to accept data from the sensor system 142 as an input. The data may include, for example, data representing information sensed at the sensors of the sensor system 142. The sensor fusion algorithm 325 may include or be configured to be executed using, for instance, a Kalman filter, Bayesian network, or one or more other algorithm. The sensor fusion algorithm 325 may provide various assessments based on the data from sensor system 142. Depending upon the embodiment, the assessments may include evaluations of evaluations of specific situations and/or evaluations of possible impacts based on the particular situation. Other assessments are possible. For example, the sensor fusion algorithm 325 may evaluate information from the vehicle sensors, vehicle systems and other information from outside the vehicle (such as GPS information) to determine whether a received tailgate opening command is remotely generated or locally generated (for example, from within the vehicle or by actuating a switch or button located on an exterior of the vehicle).

As noted above, the vehicle 100 can include the sensor system 142. The sensor system 142 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process. The sensor system 142 is operable to detect information about the vehicle 100. In arrangements in which the sensor system 142 includes a plurality of sensors, the sensors can work independently from each other. Alternatively, two or more of the sensors can work in combination with each other. In such case, the two or more sensors can form a sensor network. The sensor system 142 and/or the one or more sensors can be operably connected to the processor(s) 144, the data store(s) 327, and/or other element(s) of the vehicle 100 (including any of the elements shown in FIG. 1A).

The sensor system 142 can include any suitable type of sensor. Various examples of different types of sensors will be described herein. However, it will be understood that the embodiments are not limited to the particular sensors described. Various examples of sensors of the sensor system 142 are described herein. However, it will be understood that the embodiments are not limited to the particular sensors described. The sensor system 142 may include any sensors suitable for and/or required to perform any of the data acquisition and/or vehicle control operations contemplated herein.

Sensors of sensor system 142 may be communicably coupled to the various systems and components of the vehicle 100. The sensors may be operably connected to the vehicle wireless communications interface 383, as shown in FIG. 1A, for transmission of information to a cloud or other storage facility or for vehicle-to-vehicle (V2V) or vehicle-to-everything (V2X) communications. The sensors may also be operably connected to other vehicle systems and components, such as data stores 327 and processor(s) 144, for controlling the tailgate 118 and other portions of the vehicle 100. The existence of any predetermined conditions described herein may be calculated or otherwise determined using sensor data.

Along with the sensors shown in FIG. 1A, the vehicle 100 may include one or more additional tailgate-related sensors such as latch sensors (not shown), tailgate orientation or position sensors, and other sensors required for the performance of the vehicle control operations described herein. Relatedly, the sensor system 142 may be operable to detect, for example, the movement of the tailgate 118, the operation of the latches 134, requests to automatically open the tailgate 118, requests to automatically close the tailgate 118, and the operational statuses of one, some or all of the vehicle systems 140, including the energy system 150, the tailgate actuator 122 and the latch actuators 154, and the values of tailgate-related parameters and the existence and non-existence of various predetermined conditions.

The sensor system 142 may include one or more tailgate position sensors 379 configured to detect an opening status of the tailgate (i.e., whether the tailgate is closed, latched, partially open, fully open, etc.) and/or a rotational orientation or position of the tailgate (i.e., the degree to which the tailgate is open or closed at any given point in time).

Figure 3:
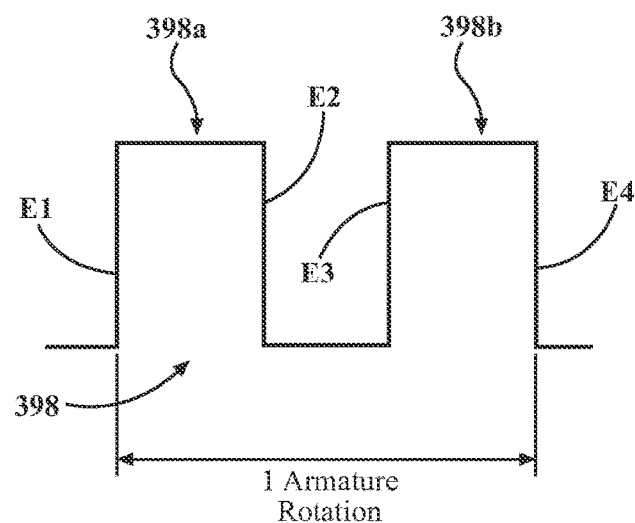
FIG. 3 is a schematic view of an exemplary output wave generated by a sensor configured for detecting motor armature rotations, accordance with an embodiment described herein.

The sensor system 142 may include a Hall-effect sensor 371 located in the actuator 122 and operably connected to the motor 210. The Hall-effect sensor 371 may be configured to detect rotations of the motor armature. In one or more arrangements, rotations of the motor armature may be counted and expressed in terms of motor rotation "edges" as represented by portions of signal pulses produced by the Hall-effect sensor 371 operably connected to the motor 210. The Hall-effect sensor 371 may be configured to detect rotations of the armature and produce signal or pulse corresponding to an armature rotation (or a fraction of an armature rotation). In one or more arrangements, the resulting signal may be in the form of one or more a square-wave(s) 398 as shown in FIG. 3. Referring to FIG. 3, in certain arrangements, the Hall-effect sensor 371 may be configured to generate two square-wave pulses (such as 398*a* and 398*b*) per armature rotation. Two square-wave pulses may include four edges E1-E4. Thus, in this arrangement, four motor rotation edges may be produced for each complete rotation of the armature. A digital counter (not shown) may be operably connected to the Hall-effect sensor for counting an actual number of motor rotation edges detected during operation of the motor 210 to raise and lower the tailgate 118 responsive to various user commands and instructions generated by the tailgate control module 323. Counter values for a current operation of the tailgate may be stored in a memory 146 for purposes of comparison with expected motor rotation edge values as described herein. The counter may be configured to automatically reset to "zero" during a manual reset of the tailgate as described herein.

The vehicle 100 can include one or more vehicle systems, collectively designated 140. Various examples of the one or more vehicle systems 140 are shown in FIG. 1A. However, the vehicle 100 can include more, fewer, or different vehicle systems. It should be appreciated that although particular vehicle systems are separately defined, each or any of the systems or portions thereof may be combined or segregated via hardware and/or software within the vehicle 100.

The vehicle systems 140 may be operable to perform vehicle functions. On behalf of the vehicle system 140 to which it belongs, each vehicle element is operable to perform, in whole or in part, any combination of vehicle functions with which the vehicle system 140 is associated. The vehicle systems 140 may be communicatively connected with the memory 146, the tailgate actuator(s) 122, processor(s) 144, and any other elements and systems of the vehicle 100 as needed to perform the tailgate control functions described herein.

The tailgate 118, latch assemblies 130, actuator(s) 122, tailgate control module 323, and any sensors providing information relating to tailgate operations may collectively define a power tailgate system of the vehicle 100. In addition, the vehicle systems 140 may include an energy system 150. Elements of the power tailgate system may be connected to the energy system 150. The energy system 150 may be operable to perform one or more energy functions, including but not limited to storing and otherwise handling electrical energy. Elements of the power tailgate system may be operable to perform one or more tailgate control functions using electrical energy from the energy system 150, including but not limited to automatically opening the tailgate 118 and automatically closing the tailgate 118.

The vehicle 100 can include an input system 156. An "input system" includes any device, component, system, element or arrangement or groups thereof that enable information/data to be input into a machine. For example, the input system 156 may include a keypad, a touch screen or other interactive display, a voice-recognition system and/or any other device or system which facilitates communications between a user and the vehicle. The input system 156 can receive wireless input from a vehicle occupant (e.g., a driver or a passenger) or a user located remotely from the vehicle 100. For example, the input system may enable a user to input tailgate control commands to the tailgate control module.

The vehicle 100 can also include an output system 158. An "output system" includes any device, component, or arrangement or groups thereof that enable information/data to be presented to a vehicle occupant (e.g., a driver, a vehicle passenger, etc.) or a remote user. For example, the output system may be operable to issue tactile, sound and visual outputs that may be sensed by users. The output system may enable a user to receive alerts or other information relating to the position, speed, and other operating parameters of the tailgate.

The vehicle wireless communications interface 383 may be configured to enable and/or facilitate communication between the components and systems of the vehicle and entities (such as cloud facilities, cellular and other mobile communications devices, other vehicles, remote servers, pedestrians, etc.) exterior of the vehicle. Wireless communications interface 383 may be configured to facilitate, establish, maintain, and end wireless V2V and V2X communications with any extra-vehicular entity, for example other connectibly-configured vehicles and connected vehicles, pedestrians, servers and entities located in the cloud, edge servers, and other information sources and entities. User-initiated commands such as wireless tailgate opening commands may be received and other types of information may be transmitted and received via the communications interface 383. If required, wireless communications interface 383 may incorporate or be in communication with any network interfaces needed to communicate with any extra-vehicular entities and/or networks.

FIGS. 4C, 5C, 6C, and 7C are flow diagrams illustrating operation of the tailgate control system in accordance with embodiments described herein. Operations of the slippable clutches disclosed herein will be described in terms of clutch 298 of FIGS. 2 and 8. However, it will be understood that this description is also applicable to operation of the slippable portions of clutch 2298 of FIGS. 9A and 9B (i.e., clutch plate 2298*p* and clutch second portion 2298*b* when these elements are engaged with each other).

Figure 4C:
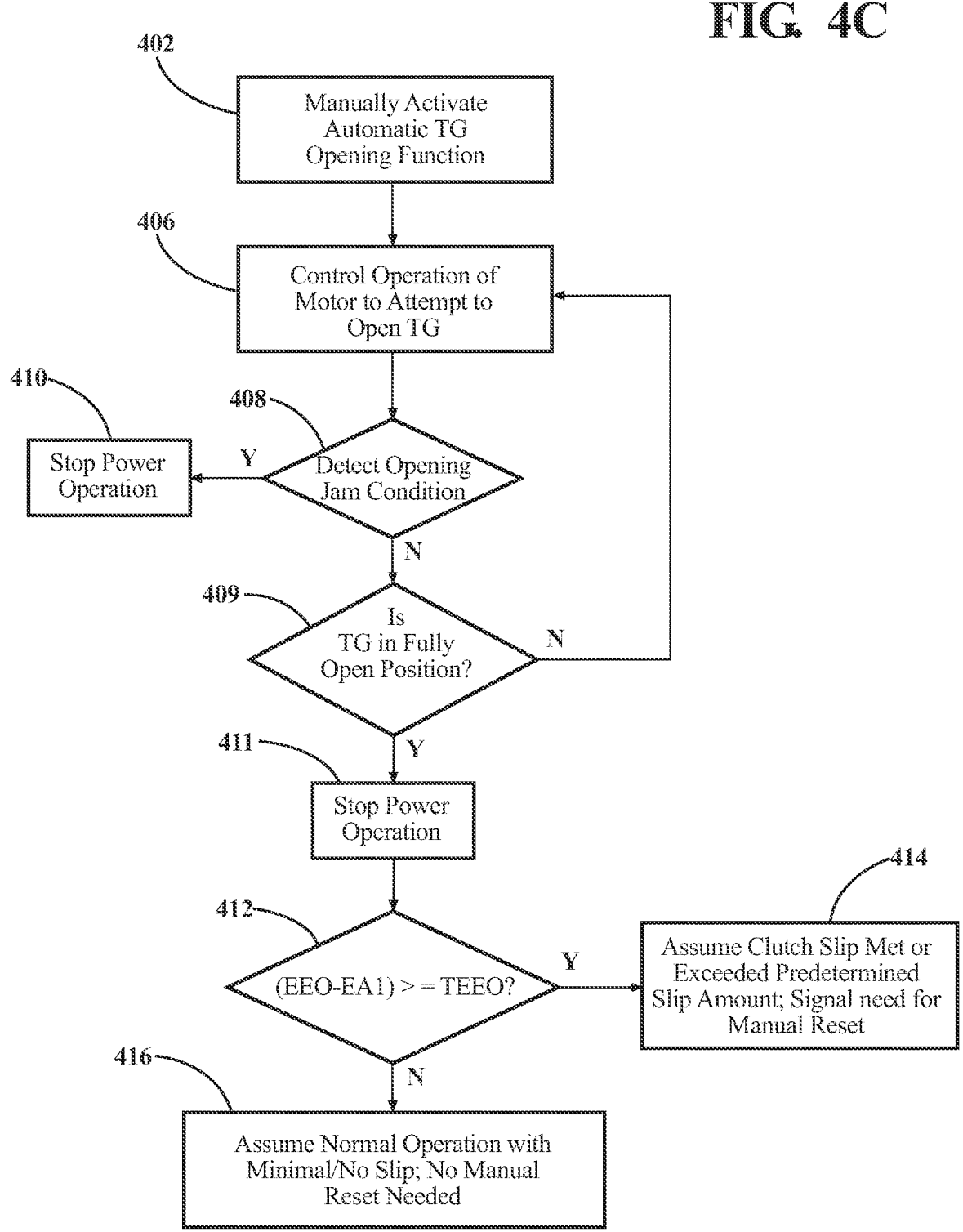

FIG. 4C is a flow diagram showing one exemplary mode of operation of the tailgate control system in a situation such as that depicted in FIGS. 4A-4B. In block 402, a user may manually activate an automatic tailgate (TG) opening function by actuating a switch or button. In block 406, the tailgate control module 323 may control operation of the motor 210 to attempt to open the tailgate 118 by exerting an opening force MF1 on the tailgate 118. The motor 210 may be controlled to generate the expected number of rotations EEO needed to lower the tailgate 118 from the fully closed position to the fully open position.

At some point during operation of the motor 210 to attempt to lower the tailgate 118, the externally applied force EF1 may also act on the tailgate 118 so as to urge it in the opening direction. The applied force EF1 may or may not cause the clutch 298 to slip. If the clutch slips, it will slip in a direction CS1 which is the same as the direction of the reduction drive output. The applied force EF1 and any resulting clutch slippage may be short term/temporary, intermittent, or constant.

At some point during operation of the motor 210 to lower the tailgate 118, a jam condition may be detected. Referring to block 408, if a jam condition is detected during operation of the motor to open the tailgate 118, the control module 323 may stop power operation of the tailgate. Otherwise, the control module 323 may (in block 409) determine if the tailgate 118 is in the fully open position.

A jam or pinch condition may occur when an obstacle in the path of motion of the tailgate 118 impedes or prevents the tailgate from moving toward the desired position. Criteria are known for jam or pinch detection in a tailgate or door attempting to open or close. For example, the current drawn by the motor 210 may be monitored for a current spike resulting from the motor "working harder" to move the tailgate 118 past an obstacle preventing the desired motion. Additional or alternative jam detection criteria may also be used.

If the tailgate 118 is not in the fully open position, the control module 323 may (in block 406) continue operating the motor to attempt to to lower the tailgate. However, if the tailgate 118 is in the fully open position, the control module 323 may (in block 411) stop power operation of the tailgate to lower the tailgate. Also, if the clutch 298 slipped due to the external load while the tailgate 118 was being lowered, the tailgate will reach the fully open position before the expected number of motor rotation edges has been detected. In this case, attainment of the fully open position may be read as a jam condition, because the motor 210 will not know that the clutch has slipped or by how much, and the motor 210 will continue to try to lower the tailgate 118 past the fully open position until the expected number of motor rotation edges have been completed. To detect this condition, the control module may (in block 412) determine if (EEO-EA1)>=TEEO (i.e., if the difference between the number of motor rotation edges EEO expected to occur during lowering of the tailgate from the fully closed position to the fully open position, and the actual number of motor rotation edges EA1 detected during the period when the tailgate moved from fully closed to fully open, is equal to or greater than the tolerance TEEO assigned to EEO).

If the difference is below the tolerance TEEO, the control module may (block 416) conclude that there was little or no clutch slip during the movement and that the system operated normally. Thus no manual reset would be needed. However, if the difference is equal to or greater than the tolerance, the control module may (block 416) conclude that the amount of clutch slippage met or exceeded the predetermined slip amount, and generate a signal indicating a need for manual reset. As stated previously, the presence of the tailgate in the fully open position may be detected by a suitable switch or sensor.

Figure 5C:
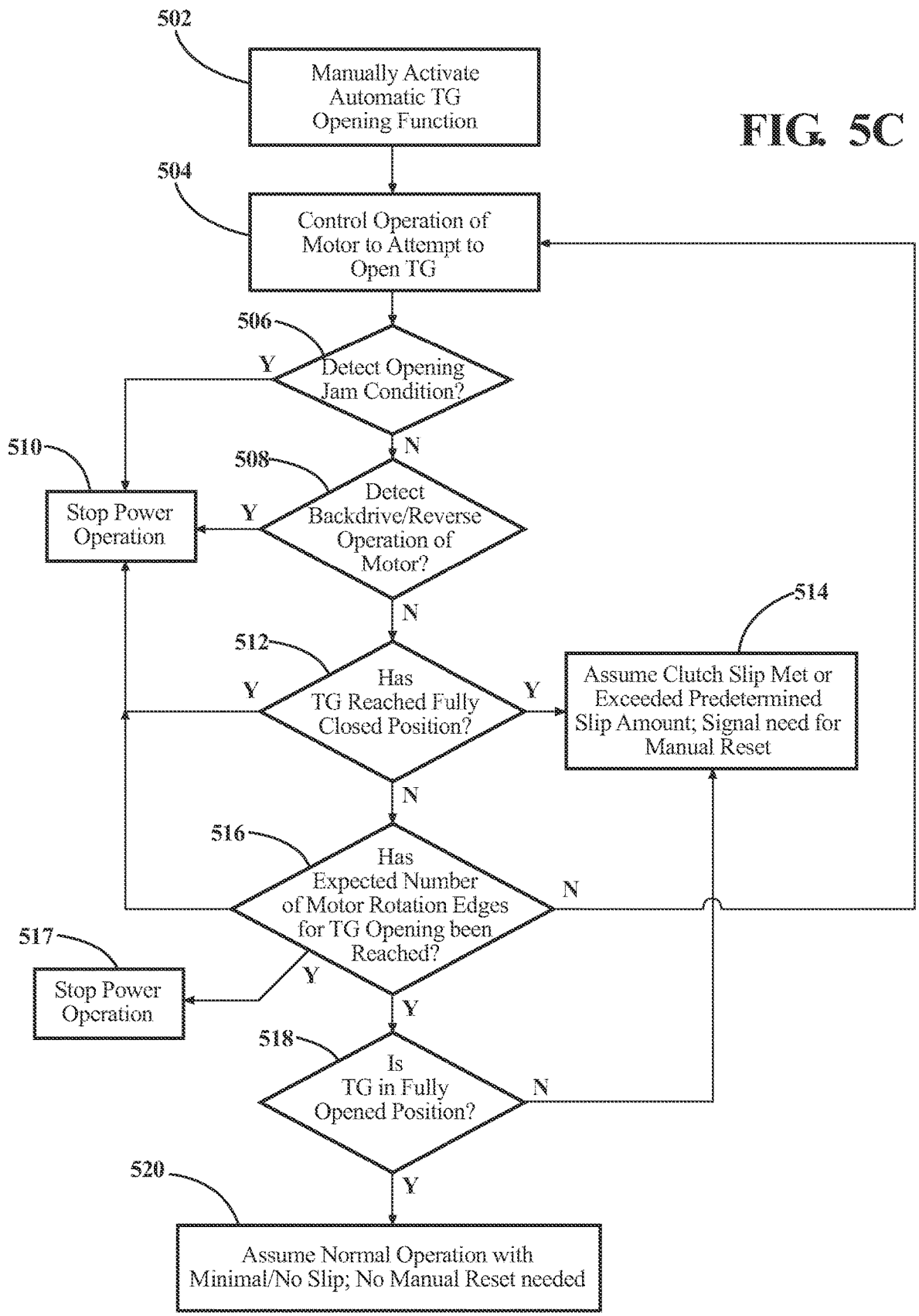

FIG. 5C is a flow diagram showing one exemplary mode of operation of the tailgate control system in a situation such as that depicted in FIGS. 5A-5B.

In block 502, a user may manually activate an automatic tailgate (TG) opening function by actuating a switch or button. In block 504, the tailgate control module 323 may control operation of the motor 210 to attempt to open the tailgate 118 by exerting an opening force MF2 on the tailgate 118. The motor 210 may be controlled to generate the expected number of rotations EEO needed to lower the tailgate from the fully closed position to the fully open position.

At some point during operation of the motor to attempt to lower the tailgate, the externally applied force EF2 may also act on the tailgate 118 so as to urge it in the closing direction. The applied force EF2 may or may not cause the clutch 298 to slip. If the clutch slips, it will slip in a direction CS2 opposite the direction of rotation MD1 of the reduction drive output. The applied force EF2 and any resulting clutch slippage may be short term/temporary, intermittent, or constant.

At some point during operation of the motor to lower the tailgate, a jam condition may be detected. Referring to block 506, if a jam condition is detected during operation of the motor to open the tailgate 118, the control module 323 may (in block 510, as shown in FIG. 5C) stop power operation of the tailgate. Also, at some point during operation of the motor 210 to lower the tailgate 118, a backdrive condition may be detected in the motor, causing reverse operation of the motor. This may be detectible using the Hall effect sensor 371. If (in block 508) reverse operation of the motor is detected, the control module may (in block 510) stop power operation of the tailgate 118. If reverse operation of the motor is not detected, the control module may (in block 512, as shown in FIG. 5C) determine if the tailgate 118 has returned to the fully closed position. if the tailgate returns to the fully closed position following a command to open the tailgate, the external load EF2 may have been sufficient to cause the tailgate 118 to close all the way instead of opening. This may indicate a condition where the clutch was constantly slipping while the tailgate was being forced in the closing direction until the tailgate was closed. The presence of the tailgate in the fully closed position may be detected by a suitable latch switch or sensor. If this condition is detected in block 512 despite that fact that the tailgate was instructured to open. the control module may (in block 510) halt power operation and (in block 514, as shown in FIG. 5C) assume that the amount of clutch slippage met or exceeded the predetermined slip amount, and signal the need for manual reset.

Returning to block 512, if the tailgate 118 has not returned to the fully closed position, the control module 323 may (in block 516) determine if the expected number EEO of motor rotation edges have been detected since the motor 210 began operation to lower the tailgate. If the expected number EEO of motor rotation edges has not been detected, control may return to block 504 to continue operation of the motor to open the tailgate 118 in the manner just described. However, if the expected number EEO of motor rotation edges has been detected, the control module may (in block 517) stop power operation of the tailgate. The EEO for purposes of this determination may include all numbers of motor rotation edges within the range (EEO±TEEO).

In addition, the control module may determine (in block 518, as shown in FIG. 5C) if the tailgate 118 is in the fully open position. If the tailgate is in the fully open position after the expected number of motor rotation edges have been implemented, the control module 323 may (block 520) conclude that there was little or no clutch slip during the movement and that the system operated normally. Thus no manual reset would be needed. However, if the tailgate 118 is not in the fully open position after the expected number of motor rotation edges have been implemented, the control module may (block 514) conclude that the amount of clutch slippage met or exceeded the predetermined slip amount, and generate a signal indicating a need for manual reset.

Figure 6C:
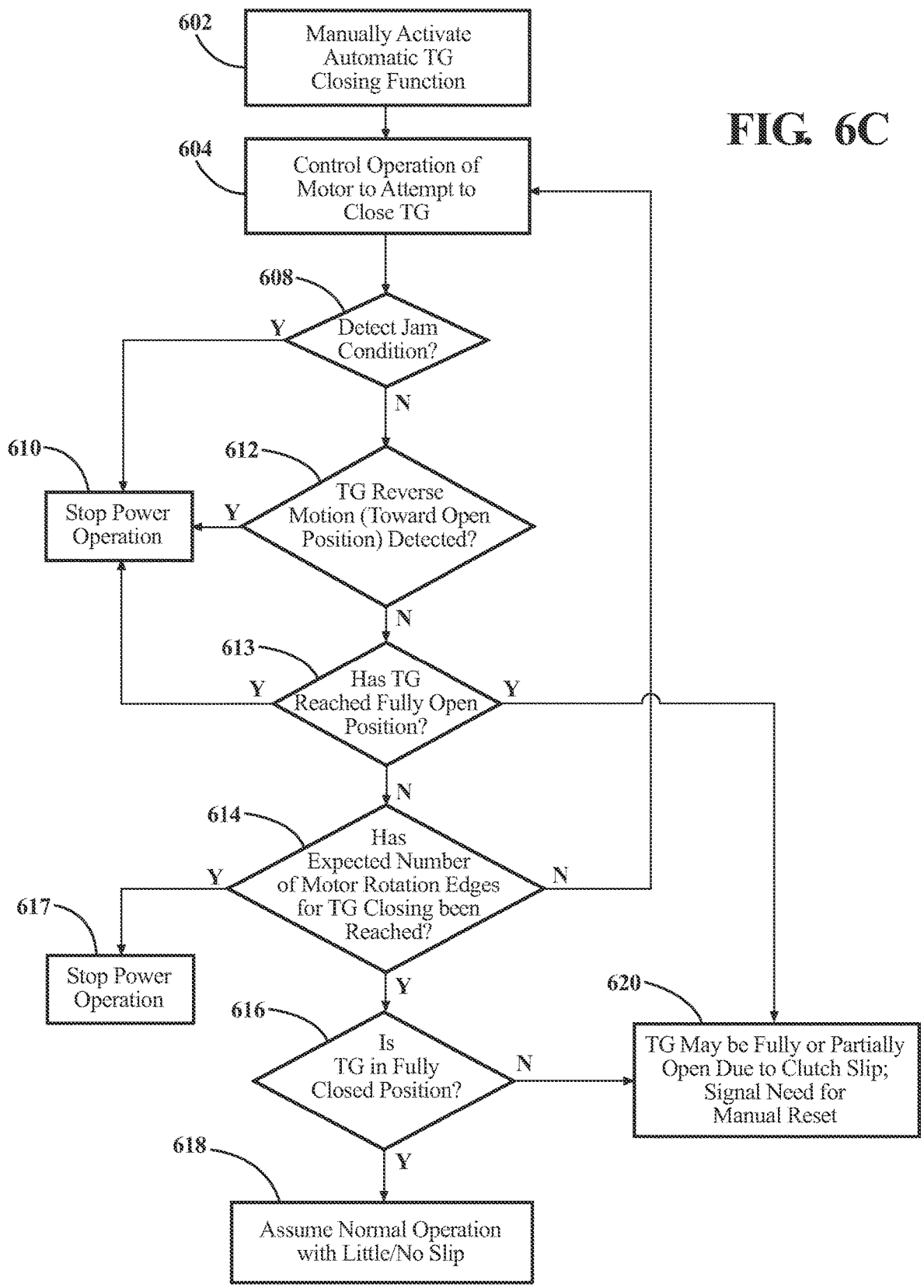

FIG. 6C is a flow diagram showing one exemplary mode of operation of the tailgate control system in a situation such as that depicted in FIGS. 6A-6B.

In block 602, a user may manually activate an automatic tailgate (TG) closing function by actuating a switch or button. In block 604, the tailgate control module 323 may control operation of the motor 210 to attempt to close the tailgate 118 by exerting an closing force MF3 on the tailgate 118. The motor 210 may be controlled to generate the expected number of rotations EEC needed to raise the tailgate from the fully open position to the fully closed position.

At some point during operation of the motor 210 to attempt to raise the tailgate 118, the externally applied force EF3 may also act on the tailgate 118 so as to urge it in the opening direction. The applied force EF3 may or may not cause the clutch 298 to slip. If the clutch slips, it will slip in a direction CS1 opposite the direction of rotation MD2 of the reduction drive output. The applied force EF3 and any resulting clutch slippage may be short term/temporary, intermittent, or constant.

At some point during operation of the motor to lower the tailgate, a jam condition may be detected. Referring to block 608, if a jam condition is detected during operation of the motor 210 to close the tailgate 118, the control module 323 may (in block 610) stop power operation of the tailgate. Also, at some point during operation of the motor 210 to raise the tailgate, a backdrive condition may be detected in the motor, causing reverse operation of the motor. This may be detectible using the Hall-effect sensor. If (in block 612) reverse operation of the motor 210 is detected, the control module 323 may (in block 610) stop power operation of the tailgate.

If reverse operation of the motor 210 is not detected, the control module may (in block 613) determine if the tailgate 118 has returned to the fully open position. if the tailgate returns to the fully open position following a command to close, the external load EF3 may have been sufficient to cause the tailgate to open all the way instead of closing. This may indicate a condition where the clutch 298 was constantly slipping while the tailgate 118 was being forced in the opening direction until the tailgate was fully open. The presence of the tailgate 118 in the fully open position may be detected by a suitable latch switch or sensor. If this condition is detected in block 613 despite that fact that the tailgate was instructured to open. The control module 323 may (in block 610) halt power operation and (in block 620) assume that the amount of clutch slippage met or exceeded the predetermined slip amount, and signal the need for manual reset.

Returning to block 613, if the tailgate has not returned to the fully open position, the control module 323 may (in block 614) determine if the expected number EEC of motor rotation edges have been detected since the motor 210 began operation to raise the tailgate. If the expected number EEC of motor rotation edges has not been detected, control may return to block 604 to continue operation of the motor to open the tailgate 118 in the manner just described. However, if the expected number EEC of motor rotation edges has been detected, the control module may (in block 617) stop power operation of the tailgate. The EEC for purposes of this determination may include all numbers of motor rotation edges within the range (EEC±TEEC).

In addition, the control module may determine (in block 616) if the tailgate 118 is in the fully closed position. If the tailgate 118 is in the fully closed position after the expected number of motor rotation edges have been implemented, the control module 323 may (block 618) conclude that there was little or no clutch slip during the movement and that the system operated normally. Thus no manual reset would be needed. However, if the tailgate 118 is not in the fully open position after the expected number of motor rotation edges have been implemented, the control module may (block 620) conclude that the amount of clutch slippage met or exceeded the predetermined slip amount, and generate a signal indicating a need for manual reset.

Figure 7C:
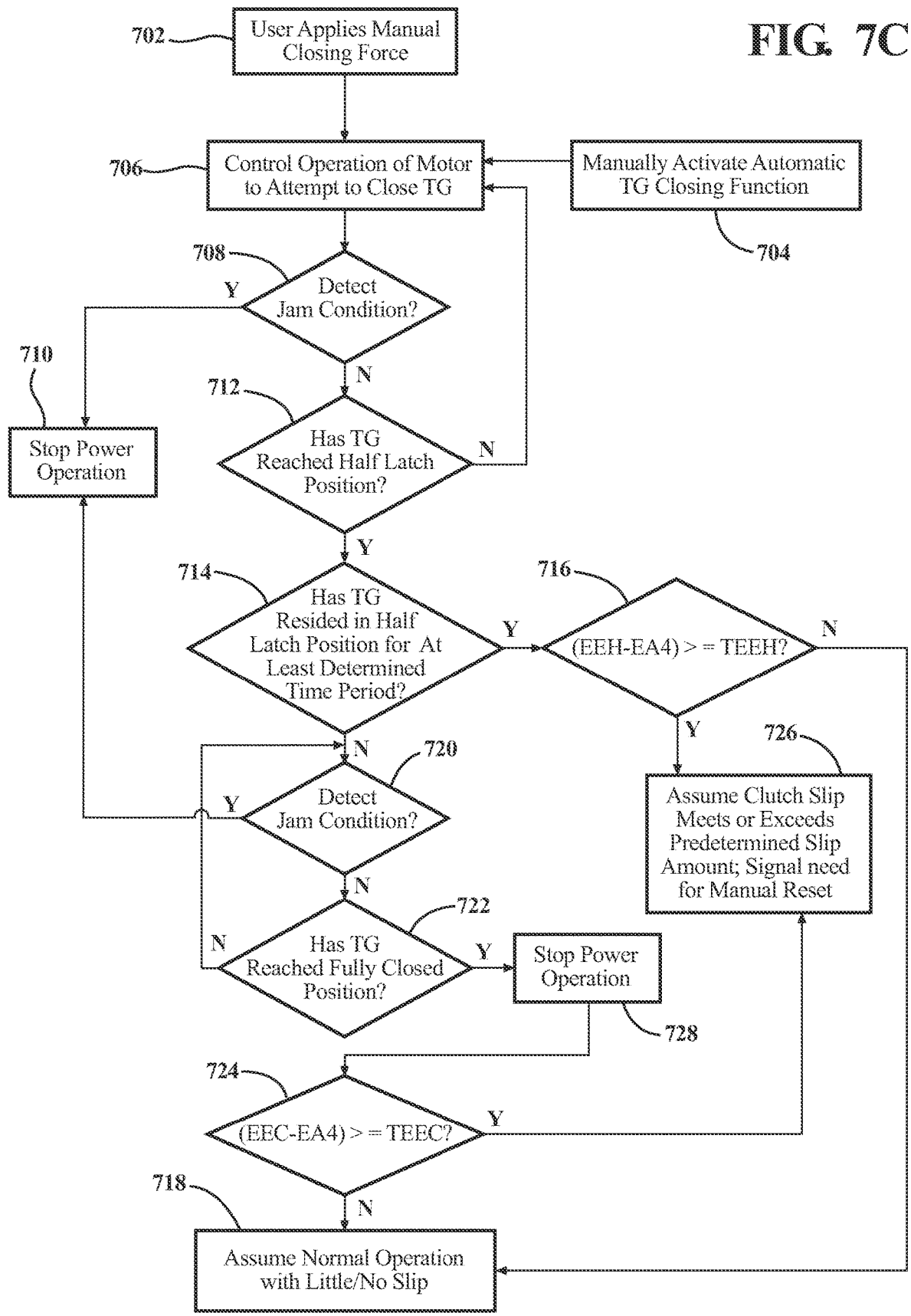

FIG. 7C is a flow diagram showing one exemplary mode of operation of the tailgate control system in a situation such as that depicted in FIGS. 7A-7B. In this operational mode, automatic closing of the tailgate 118 may be initiated in either of two ways. In a first aspect (block 702), the system may be configured to start to automatically close the tailgate responsive to an externally-applied closing force exerted by a human user. The backdrive produced by the external force may be interpreted by the system as a user desire to close the tailgate. In another aspect (block 704), a user may manually activate an automatic tailgate closing function by actuating a switch or button as previously described. Responsive to either of these inputs, the control module 323 may (block 706) control the motor 210 to generate the expected number of motor rotation edges EEC associated with raising the tailgate from the fully open position to the fully closed position.

If a jam condition is detected (block 708), the control module 323 may (in block 710) stop power operation of the tailgate 118.

In one or more arrangements, the vehicle may have a half-latch capability for holding the tailgate 118 in a half-latched position, and a full-latch capability for holding the tailgate in the fully-closed position. A user may desire to close the tailgate to the half-latched position. This may be reflected in the user selecting a command to automatically close the tailgate 118 to the half-latched position or by the user exerting an external force EF4 to move the tailgate to this position, then removing the external force.

If the tailgate 118 reaches the half-latched position (block 712) and remains in this position for at least a predetermined time period (block 714), the control module 323 may assume that the user desires to leave the tailgate in the half-latched position. The control module 323 may then (in block 716) compare the number of motor rotations EEH expected in moving the tailgate from the fully open position to the half-latched position, with the actual number of rotations EA4 detected by operation of the motor to move the tailgate 118 to the half-latched position. If the difference between these values is less than the tolerance TEEH, the control module 323 may assume (block 718) that the tailgate 118 moved to the half-latched position with minimal/no slip of the clutch. Then, no manual reset of the system will be needed. However, if the calculated difference is greater than the tolerance TEEH (for example, the actual number of rotations required to move the tailgate to the half-latched position is markedly less than the expected number EEH), the control module 323 may assume that the clutch slip was equal to or greater than the predetermined slip amount due to application of the external load EF4 to the tailgate during movement of the tailgate from the fully open position to the half-latched position. In this case, the control module 323 may (in block 726) signal the need for manual reset.

Returning to block 714, if the tailgate 118 does not remain in the half-latched position for at least the predetermined time period, the control module 323 may assume that it is desired to move the tailgate to the fully-closed position. The control module 323 may then continue to operate the motor 210 to move the tailgate toward the fully-closed position unless a jam condition is detected in block 720. If a jam condition is detected, the system may (block 710) stop power operation of the tailgate.

During movement of the tailgate 118 between the fully-open position and the fully-closed position, the clutch 298 may also slip due to application of the external force EF4. The applied force EF4 may or may not cause the clutch to slip. If the clutch slips, it will slip in a direction CS2 (FIG. 7B) which is the same as the rotation direction MD2 of the reduction drive output. The applied force EF4 and any resulting clutch slippage may be short term/temporary, intermittent, or constant.

If no jams are detected, the control module may continue to control operation of the motor 210 to close the tailgate 118 until (block 722) the tailgate has reached the fully closed position. When the tailgate reaches the fully closed position, the control module 323 may (block 728) stop power operation of the tailgate. The control module 323 may then (block 724) compare the number of motor rotations edges EEC expected in moving the tailgate from the fully open position to the fully-closed position, with the actual number of motor rotation edges EA4 detected by the motor when the tailgate has arrived in the fully-closed position. If the difference between these values is less than the tolerance TEEC, the control module may assume (block 718) that the tailgate was moved to the fully-closed position with minimal/no slip of the clutch. Then, no manual reset of the system will be needed. However, if the calculated difference is equal to or greater than the tolerance TEEC (for example, the actual number of rotations EA4 required to move the tailgate to fully-closed is markedly less than the expected number EEC), the control module 323 may assume that the clutch slip was equal to or greater than the predetermined slip amount due to application of the external load EF4 to the tailgate during movement of the tailgate from the fully open position to the fully closed position. In this case, the control module may (in block 726) signal the need for manual reset.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, modules as used herein include routines, programs, objects, components, data structures, and so on that perform specific tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module, as envisioned by the present disclosure, is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A method for controlling a power tailgate in a vehicle power tailgate system, the method comprising steps of:
controlling operation of a motor to attempt to raise a tailgate operably connected to the motor from a fully open position to a fully closed position;
determining that the tailgate is currently in the fully closed position;
responsive to a determination that tailgate is currently in the fully closed position, discontinuing operation of the motor;
determining that a difference between a number of motor rotation edges expected to occur during operation of the motor to raise of the tailgate from the fully open position to the fully closed position, and a number of motor rotation edges that occurred during operation of the motor to attempt to raise the tailgate from a fully open position to a fully closed position, is greater than or equal to a predetermined tolerance value; and
responsive to the difference being greater than or equal to the predetermined tolerance value, generating an alert indicating a need for manual reset of the tailgate.

2. The method of claim 1 comprising a step of, simultaneously with or following generating the alert, automatically controlling operation of the power tailgate system to power down the motor.

3. The method of claim 1 comprising a step of, following generating the alert, and responsive to receipt of a user-generated command to power down the motor, automatically controlling operation of the power tailgate system to power down the motor.

4. The method of claim 1, further comprising steps of:
automatically disengaging the motor from the tailgate to enable manual reset of the tailgate;
determining that the manual reset of the tailgate is complete; and
responsive to the manual reset of the tailgate being complete, automatically operably re-engaging the motor with the tailgate.

5. The method of claim 4, wherein the power tailgate system includes a slippable clutch interposed between the motor and the tailgate, and an automatically actuatable second clutch in addition to the slippable clutch, the automatically actuatable second clutch including a first portion operably connected to the motor and a second portion rigidly attached to a portion of a slippable clutch operably connected to the tailgate, the automatically actuatable second clutch first portion being engageable with the automatically actuatable second clutch second portion to enable non-slippable transmission of torque between the motor and the slippable clutch, the automatically actuatable second clutch first portion being disengageable from the automatically actuatable second clutch second portion to prevent transmission of torque between the motor and the slippable clutch, and wherein the step of automatically disengaging the motor from the tailgate comprises a step of operating the automatically actuatable second clutch to disengage the automatically actuatable second clutch first portion from the automatically actuatable second clutch second portion.

6. The method of claim 4, wherein the slippable clutch comprises an automatically actuatable clutch operably connected to the motor and the tailgate, the automatically actuatable clutch including a first portion operably connected to the motor and a second portion operably connected to the tailgate, the automatically actuatable clutch being structured to provide non-slippable torque transmission between the motor and the first portion, the automatically actuatable clutch also including a mechanism structured to be engageable to enable slippable torque transmission between the motor and the second portion and disengageable to prevent torque transmission between the motor and the second portion, and wherein the step of automatically disengaging the motor from the tailgate comprises a step of operating the automatically actuatable clutch to disengage the mechanism to prevent torque transmission between the motor and the second portion.

7. The method of claim 1, wherein the vehicle power tailgate system includes a half-latch capability for holding the tailgate in a half-latched or partially closed position, and a full-latch capability for holding the tailgate in a fully-closed position, and wherein the method further comprises steps of:
controlling operation of the motor to attempt to raise the tailgate from a fully open position to the half-latched position;
during operation of the motor to attempt to raise the tailgate, determining that the tailgate is currently in the half-latched position;

determining that the tailgate has been in the half-latched position for at least a time equal to a predetermined time period;

determining that a difference between a number of motor rotation edges expected to occur during raising of the tailgate from the fully open position to the half-latched position, and a number of motor rotation edges that occurred during operation of the motor to attempt raise the tailgate from the fully open position to the half-latched position is greater than or equal to a predetermined tolerance value; and responsive to the difference being greater than or equal to the predetermined tolerance value, determining that the clutch slipped by at least the predetermined slip amount.

8. The method of claim 1, further comprising steps of:

determining that the tailgate has returned to the fully open position during operation of the motor to attempt to raise the tailgate from the fully open position to the fully closed position; and responsive to the determination that the tailgate has returned to the fully open position, generating the alert indicating a need for manual reset of the tailgate.

9. The method of claim 1, further comprising steps of:

determining that a backdrive condition is occurring in the motor responsive to application of an externally-applied force to the tailgate when the tailgate is in a fully open condition, the externally-applied force acting to promote raising of the tailgate; and responsive to the occurrence of the backdrive condition, controlling operation of the motor to attempt to raise the tailgate.

10. The method of claim 1, wherein the tailgate is subjected to an externally-applied force during at least a portion of operation of the motor to attempt to raise the tailgate, wherein the externally-applied force acts in a direction that promotes raising of the tailgate, wherein a slippable clutch is interposed between the motor and the tailgate and is operably connected to the motor and the tailgate, wherein slippage of the slippable clutch by at least a predetermined slip amount is produced by the externally-applied force, and wherein generation of the alert is prompted by a determination that the clutch slipped by at least the predetermined slip amount.

11. The method of claim 1, wherein manual reset of the tailgate includes steps of:

disengaging the tailgate from the motor; and manipulating the tailgate to a fully closed position of the tailgate so as to activate switches or sensors indicating that the tailgate is in the fully closed position.

12. A method for controlling a power tailgate in a vehicle power tailgate system, the method comprising steps of:

controlling operation of a motor to attempt to lower the tailgate from a fully closed position to a fully open position;

determining that the tailgate is in the fully open position;

discontinuing operation of the motor to attempt to lower the tailgate;

determining that a difference between a number of motor rotation edges expected to occur during operation of the motor to lower the tailgate from the fully closed position to the fully open position, and a number of motor rotation edges that occurred during operation of the motor to attempt to lower the tailgate from the fully closed position to the fully open position, is greater than or equal to a predetermined tolerance value; and responsive to the determination that the difference is greater than or equal to the predetermined tolerance value, generating an alert indicating a need for manual reset of the tailgate.

13. The method of claim 12 wherein the tailgate is subjected to an external force during at least a portion of operation of the motor to attempt to lower the tailgate, wherein the external force acts in a direction that promotes lowering of the tailgate, wherein a slippable clutch is interposed between the motor and the tailgate and is operably connected to the motor and the tailgate, wherein slippage of the slippable clutch by at least a predetermined slip amount is produced by the external force, and wherein generation of the alert is prompted by a determination that the clutch slipped by at least the predetermined slip amount.

14. A method for controlling a power tailgate in a vehicle power tailgate system, the method comprising steps of:

controlling operation of a motor to attempt to lower the tailgate from a fully closed position to a fully open position;

determining that a number (EEO) of motor rotation edges expected to occur during operation of the motor to lower the tailgate from the fully closed position to the fully open position has been reached;

determining that the tailgate has not reached the fully open position; and responsive to the determinations that the number (EEO) of motor rotation edges expected to occur during operation of the motor to lower the tailgate from the fully closed position to the fully open position has been reached and the tailgate has not reached the fully open position, generating an alert indicating a need for manual reset of the tailgate.

15. The method of claim 14, further comprising steps of:

determining that the tailgate has returned to the fully closed position during operation of the motor to attempt to lower the tailgate from the fully closed position to the fully open position; and responsive to the determination that the tailgate returned to the fully closed position, generating the alert indicating a need for manual reset of the tailgate.

16. The method of claim 14, wherein the tailgate is subjected to an externally-applied force during at least a portion of operation of the motor to attempt to lower the tailgate, wherein the externally-applied force acts in a direction that opposes lowering of the tailgate, wherein a slippable clutch is interposed between the motor and the tailgate and is operably connected to the motor and the tailgate, wherein slippage of the slippable clutch by at least a predetermined slip amount is produced by the externally-applied force, and wherein generation of the alert is prompted by a determination that the clutch slipped by at least the predetermined slip amount.

17. A method for controlling a power tailgate in a vehicle power tailgate system, the method comprising steps of:

controlling operation of the motor to attempt to raise the tailgate from a fully open position to a fully closed position;

determining that a number of motor rotation edges expected to occur during operation of the motor to raise the tailgate from the fully open position to the fully closed position has been reached;

determining that the tailgate has not reached the fully closed position; and responsive to determinations that the number of motor rotation edges expected to occur during operation of the motor to raise the tailgate from the fully open position to the fully closed position has been reached and the tailgate has not reached the fully closed position, generating an alert indicating a need for manual reset of the tailgate.

18. The method of claim 17, wherein the tailgate is subjected to an externally-applied force during at least a portion of operation of the motor to attempt to raise the tailgate, wherein the externally-applied force acts in a direction that opposes raising of the tailgate, wherein a slippable clutch is interposed between the motor and the tailgate and is operably connected to the motor and the tailgate, wherein slippage of the clutch by at least a predetermined slip amount is produced by the externally-applied force, and wherein generation of the alert is prompted by a determination that the clutch slipped by at least the predetermined slip amount.

* * * * *